US012669609B2

(12) United States Patent
Cheng et al.

(10) Patent No.: US 12,669,609 B2
(45) Date of Patent: Jun. 30, 2026

(54) SYSTEMS AND METHODS FOR SPARSE CONVOLUTION OF UNSTRUCTURED DATA

(71) Applicants: Ran Cheng, Shanghai (CN); Ryan Razani, Toronto (CA); Yuan Ren, Thornhill (CA); Bingbing Liu, Beijing (CN)

(72) Inventors: Ran Cheng, Shanghai (CN); Ryan Razani, Toronto (CA); Yuan Ren, Thornhill (CA); Bingbing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1074 days.

(21) Appl. No.: 17/747,722

(22) Filed: May 18, 2022

(65) Prior Publication Data

US 2022/0381914 A1       Dec. 1, 2022

Related U.S. Application Data

(60) Provisional application No. 63/195,048, filed on May 30, 2021.

(51) Int. Cl.
| | |
|---|---|
| *G06N 3/08* | (2023.01) |
| *G01S 17/89* | (2020.01) |
| *G01S 17/931* | (2020.01) |

(52) U.S. Cl.
CPC ............ *G01S 17/89* (2013.01); *G01S 17/931* (2020.01); *G06N 3/08* (2013.01)

(58) Field of Classification Search
CPC .......... G01S 17/89; G01S 17/931; G06N 3/08
See application file for complete search history.

(56) References Cited

U.S. PATENT DOCUMENTS

| | | |
|---|---|---|
| 2013/0282386 A1 | 10/2013 | Vilermo et al. |
| 2019/0146497 A1 | 5/2019 | Urtasun et al. |
| 2019/0147335 A1 | 5/2019 | Wang et al. |
| 2019/0156206 A1 | 5/2019 | Graham et al. |
| 2021/0081717 A1 | 3/2021 | Creed et al. |

OTHER PUBLICATIONS

Wang, G. et al., "Anchor-based spatial-temporal attention convolutional networks for dynamic 3d point cloud sequences," downloaded from <arxiv.org/abs/2012.10860v1> (Dec. 20, 2020) 10 pp. (Year: 2020).*

(Continued)

*Primary Examiner* — Brian M Smith

(57) ABSTRACT

Systems and methods are disclosed for processing sparse tensors using a trained neural network model. An input sparse tensor may represent a sparse input point cloud. The input sparse tensor is processed using an encoder stage having a series of one or more encoder blocks, wherein each encoder block includes a sparse convolution layer, a sparse intra-channel attention module, a sparse inter-channel attention module, and a sparse residual tower module. Output from the encoder stage is processed using a decoder stage having a series of one or more decoder blocks, wherein each decoder block includes a sparse transpose convolution layer, a sparse inter-channel attention module, and a sparse residual tower module. The output of the decoder stage is an output sparse tensor representing a sparse labeled output point cloud.

6 Claims, 13 Drawing Sheets

(56) References Cited

OTHER PUBLICATIONS

Hu, J. et al., "Squeeze-and-excitation networks," 2018 IEEE/CVF Conf. on Computer Vision and Pattern Recognition (Jun. 2018) 10 pp. (Year: 2018).*

Su, C. et al., "SqueezeSegV3: spatially-adaptive convolution for efficient point-cloud segmentation," downloaded from <arxiv.org/abs/2004.01803> (Apr. 13, 2021) 21 pp. (Year: 2021).*

Rothauge, K. et al., "Residual networks as nonlinear systems: stability analysis using linearization," downloaded from <arxiv.org/abs/1905.13386> (May 31, 2019) (Year: 2019).*

Wen, X. et al., "Point cloud completion by skip-attention network with hierarchical folding," 2020 IEEE/CVF Conf. on Computer Vision and Pattern Recognition (Jun. 2020) 10 pp. (Year: 2020).*

Xia, Y. et al., "SOE-net: a self-attention and orientation encoding network for point cloud based place recognition," downloaded from <arxiv.org/abs/2011.12430> (May 23, 2021) 10 pp. (Year: 2021).*

Wang, X. et al., "Exploiting local and global structure for point cloud semantic segmentation with contextual point representations," 33rd Conf. on Neural Inform. Processing Systems (NeurIPS 2019) 11 pp. (Year: 2019).*

Sun, Q. et al., "DAGC: employing dual attention and graph convolution for point cloud based place recognition," ICMR '20 Intl. Conf. on Multimedia Retrieval (Jun. 8-11, 2020) pp. 224-232 (Year: 2020).*

Qi, Charles R., et al. "Pointnet: Deep learning on point sets for 3d classification and segmentation." Proceedings of the IEEE conference on computer vision and pattern recognition 2017.

Charles Ruizhongtai Qi, Li Yi, Hao Su, and Leonidas J Guibas. "Pointnet++: Deep hierarchical feature learning on point sets in a metric space." In Advances in neural information processing systems 2017.

C. Choy, J. Gwak, and S. Savarese. 4d spatio-temporalconvnets: Minkowski convolutional neural networks. In Proceedings of the IEEE Conference on Computer Vision and Pattern361 Recognition 2019.

Wu, Bichen, et al. "Squeezeseg: Convolutional neural nets with recurrent crf for real-time road-object segmentation from 3d lidar point cloud." 2018 IEEE International Conference on Robotics and Automation (ICRA) 2018.

Wu, Bichen, et al. "Squeezesegv2: Improved model structure and unsupervised domain adaptation for road-object segmentation from a lidar point cloud." 2019 International Conference on Robotics and Automation (ICRA). IEEE 2019.

Wang, Yuan, et al. "Pointseg: Real-time semantic segmentation based on 3d lidarpoint cloud." arXivpreprint arXiv:1807.06288 2018.

Yu, Fisher, and VladlenKoltun. "Multi-scale context aggregation by dilated convolutions." arXivpreprint arXiv:1511.07122 2015.

* cited by examiner

110

108

107

| Sparse transpose convolution 3x3x3 |
| Sparse inter-channel attention module 3, 1 |
| Sparse residual tower module 3x3x3 |

Decoder block 120 (256 -> 64)

108 110

106

104

| Sparse convolution 3x3x3 |
| Sparse intra-channel attention module 3, 1 |
| Sparse inter-channel attention module 3, 1 |
| Sparse residual tower module 3x3x3 |

Encoder block 118 (64 -> 256)

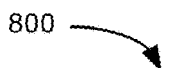

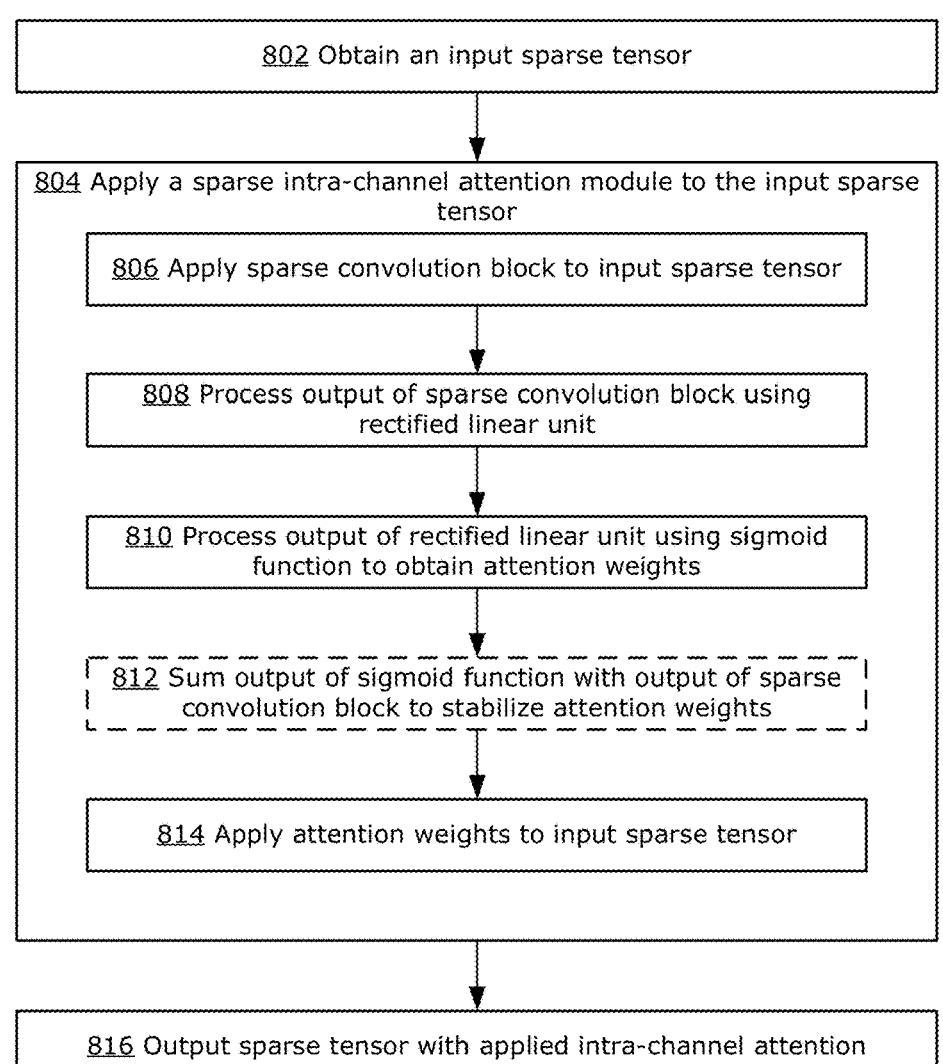

800

802 Obtain an input sparse tensor

804 Apply a sparse intra-channel attention module to the input sparse tensor

806 Apply sparse convolution block to input sparse tensor

808 Process output of sparse convolution block using rectified linear unit

810 Process output of rectified linear unit using sigmoid function to obtain attention weights 812 Sum output of sigmoid function with output of sparse convolution block to stabilize attention weights 814 Apply attention weights to input sparse tensor 816 Output sparse tensor with applied intra-channel attention

FIG. 8

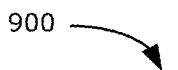
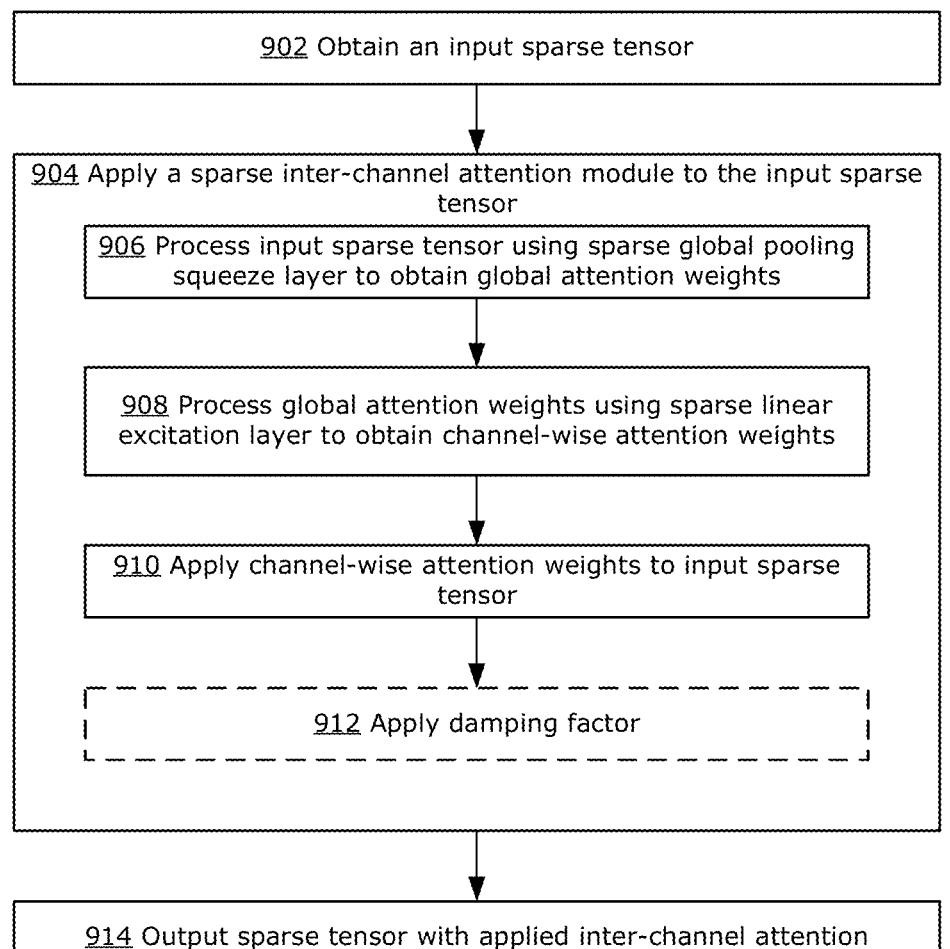
FIG. 9

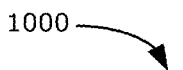

1000

```
┌─────────────────────────────────────────────────────────────────┐
│              1002 Obtain an input sparse tensor                   │
└─────────────────────────────────────────────────────────────────┘
                              │
                              ▼
┌─────────────────────────────────────────────────────────────────────┐
│ 1004 Process input sparse tensor through a series of sparse residual submodules │
│                                                                       │
│  ┌─────────────────────────────────────────────────────────────────┐ │
│  │            1006 Apply each sparse residual submodule             │ │
│  │                                                                 │ │
│  │  ┌ ─ ─ ─ ─ ─ ─ ─ ─ ─ ─ ─ ─ ─ ─ ─ ─ ─ ─ ─ ─ ─ ─ ─ ─ ─ ─ ─ ┐  │ │
│  │   1008 Obtain sparse tensor from preceding sparse residual     │ │
│  │  │                    submodule                             │  │ │
│  │  └ ─ ─ ─ ─ ─ ─ ─ ─ ─ ─ ─ ─ ─ ─ ─ ─ ─ ─ ─ ─ ─ ─ ─ ─ ─ ─ ─ ┘  │ │
│  │                            │                                    │ │
│  │                            ▼                                    │ │
│  │  ┌───────────────────────────────────────────────────────────┐ │ │
│  │  │ 1010 Process input sparse tensor using series of sparse     │ │ │
│  │  │ convolution blocks, including particular sparse convolution │ │ │
│  │  │ block having convolution kernel that causes rearrangement   │ │ │
│  │  │                  of data points                             │ │ │
│  │  └───────────────────────────────────────────────────────────┘ │ │
│  │                            │                                    │ │
│  │                            ▼                                    │ │
│  │  ┌───────────────────────────────────────────────────────────┐ │ │
│  │  │ 1012 In skip connection, process input sparse tensor using  │ │ │
│  │  │ duplicate sparse convolution block corresponding to         │ │ │
│  │  │ particular sparse convolution block in series of sparse     │ │ │
│  │  │                  convolution blocks                         │ │ │
│  │  └───────────────────────────────────────────────────────────┘ │ │
│  │                            │                                    │ │
│  │                            ▼                                    │ │
│  │  ┌───────────────────────────────────────────────────────────┐ │ │
│  │  │ 1014 Sum output of series of sparse convolution blocks with │ │ │
│  │  │ output of sparse convolution block in skip connection       │ │ │
│  │  └───────────────────────────────────────────────────────────┘ │ │
│  │                            │                                    │ │
│  │                            ▼                                    │ │
│  │  ┌ ─ ─ ─ ─ ─ ─ ─ ─ ─ ─ ─ ─ ─ ─ ─ ─ ─ ─ ─ ─ ─ ─ ─ ─ ─ ─ ─ ┐  │ │
│  │     1016 Provide summed result to next sparse residual         │ │
│  │  │                    submodule                             │  │ │
│  │  └ ─ ─ ─ ─ ─ ─ ─ ─ ─ ─ ─ ─ ─ ─ ─ ─ ─ ─ ─ ─ ─ ─ ─ ─ ─ ─ ─ ┘  │ │
│  └─────────────────────────────────────────────────────────────────┘ │
└─────────────────────────────────────────────────────────────────────┘
                              │
                              ▼
┌─────────────────────────────────────────────────────────────────┐
│                1018 Output sparse tensor                          │
└─────────────────────────────────────────────────────────────────┘
```

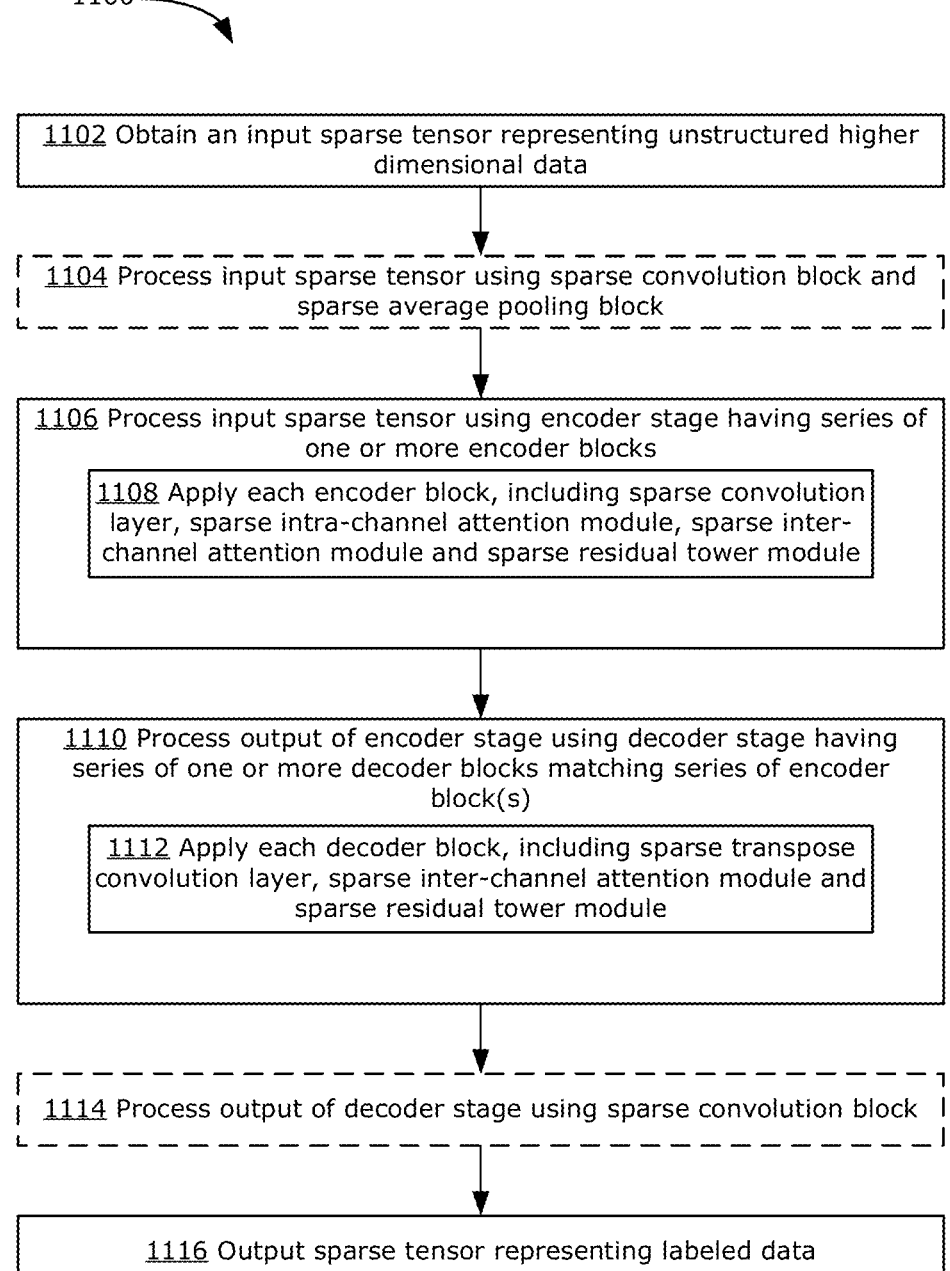

1102 Obtain an input sparse tensor representing unstructured higher dimensional data 1104 Process input sparse tensor using sparse convolution block and sparse average pooling block 1106 Process input sparse tensor using encoder stage having series of one or more encoder blocks 1108 Apply each encoder block, including sparse convolution layer, sparse intra-channel attention module, sparse inter-channel attention module and sparse residual tower module 1110 Process output of encoder stage using decoder stage having series of one or more decoder blocks matching series of encoder block(s)

1112 Apply each decoder block, including sparse transpose convolution layer, sparse inter-channel attention module and sparse residual tower module 1114 Process output of decoder stage using sparse convolution block 1116 Output sparse tensor representing labeled data

FIG. 11

SYSTEMS AND METHODS FOR SPARSE CONVOLUTION OF UNSTRUCTURED DATA

RELATED APPLICATION DATA

This disclosure claims priority from U.S. provisional patent application No. 63/195,048, entitled "SPARSE SEMANTIC SEGMENTATION SYSTEM AND METHOD FOR POINT CLOUDS", filed May 30, 2021, the entirety of which is hereby incorporated by reference.

FIELD

The present disclosure generally relates to sparse convolution of higher dimensional unstructured data, such as 3D point clouds, for example for performing semantic segmentation tasks.

BACKGROUND

Perception is one of the primary tasks for autonomous driving. Light Detection and Ranging (LIDAR) sensors are considered an effective sensor for perception tasks because of their active sensing nature with high resolution of sensor readings.

A LIDAR sensor generates point cloud data representing a three-dimensional (3D) environment (also called a "scene") scanned by the LIDAR sensor. In this way, data generated by the LIDAR sensor may be referred to as 3D data. A single scanning pass of the LIDAR sensor generates a "frame" of point cloud data (referred to hereinafter as a "point cloud"), consisting of a set of points from which light is reflected from one or more points in space, within a time period representing the time it takes the LIDAR sensor to perform one scanning pass. Some LIDAR sensors, such as spinning scanning LIDAR sensors, includes a laser array that emits light in an arc and the LIDAR sensor rotates around a single location to generate a point cloud; others LIDAR sensors, such as solid-state LIDAR sensors, include a laser array that emits light from one or more locations and integrate reflected light detected from each location together to form a point cloud. Each laser in the laser array is used to generate multiple points per scanning pass, and each point in a point cloud corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). The other data may be represented as an array of values in some implementations. In a scanning spinning LIDAR sensor, the Z axis of the point cloud is typically defined by the axis of rotation of the LIDAR sensor, roughly orthogonal to an azimuth direction of each laser in most cases (although some LIDAR sensor may angle some of the lasers slightly up or down relative to the plane orthogonal to the axis of rotation).

Point clouds may also be generated by other scanning technologies, such as high-definition radar or depth cameras, and theoretically any technology using scanning beams of energy, such as electromagnetic or sonic energy, could be used to generate point clouds. Whereas examples will be described herein with reference to LIDAR sensors, it will be appreciated that other sensor technologies which generate point clouds could be used in some embodiments.

Although many machine learning-based techniques have been developed for processing two-dimensional (2D) data, such techniques are not readily extendible to 3D or higher dimensional data, including point clouds. Accordingly, it would be useful to provide machine learning-based methods and systems for processing 3D data or higher dimensional data, including point clouds.

SUMMARY

The present disclosure describes devices, systems, methods, and media for processing of higher dimensional unstructured data, such as point clouds obtained, for example, from LIDAR sensors.

In some examples, a sparse intra-channel attention module is described, which may be implemented in a neural network model configured to process 3D (or higher dimensional) unstructured data. The disclosed sparse intra-channel attention module may enable the neural network model to benefit from obtaining a feature representation in which attention can be placed based on local information, which may be useful for performing various perception tasks, for example to perform a semantic segmentation task.

In some examples, a sparse inter-channel attention module is described, which may be implemented in a neural network model configured to process 3D (or higher dimensional) unstructured data. The disclosed sparse inter-channel attention module may enable the neural network model to benefit from obtaining a more robust feature representation in which attention can be placed on channel-wise features, which may be useful for performing various perception tasks, for example to perform a semantic segmentation task.

In some examples, a sparse residual tower module is described, which may be implemented in a neural network model configured to process 3D (or higher dimensional) unstructured data. The disclosed sparse residual tower module may enable the neural network model to benefit from being able to process the sparse higher dimensional data more efficiently and to generate richer features, which may be useful for performing various perception tasks, for example to perform a semantic segmentation task.

Examples of the present disclosure may be implemented in a 3D sparse convolutional neural network (CNN) model for semantic segmentation, as disclosed herein. For example, the sparse intra-channel attention module, the sparse inter-channel attention module and the sparse residual module may be used as building blocks of the 3D sparse CNN model.

A technical advantage of examples of the present disclosure is that a trained neural network model (e.g., a sparse semantic segmentation system) may, using examples disclosed herein, process unstructured higher dimensional data (e.g., sparse 3D point clouds) using sparse convolution, which may enable more effective and/or more accurate machine learning-based perception.

In an example first aspect, the present disclosure describes a system including a processor device; and a memory storing instructions that configure the processor device to compute a block of a trained neural network model, the block including a sparse intra-channel attention module. Computing the block includes: obtaining, as input to the block of the trained neural network model, an input sparse tensor; applying the sparse intra-channel attention module to the input sparse tensor by: applying a sparse convolution block to the input sparse tensor; processing output of the sparse convolution block using a rectified linear unit; processing output of the rectified linear unit using a sigmoid function to obtain a set of intra-channel attention weights; and applying the set of intra-channel attention weights to the input sparse tensor to obtain an output sparse tensor having intra-channel attention applied. Computing the block also includes: outputting the output sparse tensor as an output of the block of the trained neural network model.

In an example of the preceding example first aspect of the system, the block of the trained neural network model may be an encoder block of an encoder stage of the trained neural network model.

In an example of any of the preceding examples of the first aspect of the system, the instructions may further configure the processor device to: prior to applying the set of intra-channel attention weights to the input sparse tensor, stabilize the set of intra-channel attention weights by summing the set of intra-channel attention weights with the output of the sparse convolution block; and applying the set of intra-channel attention weights, after the stabilizing, to the input sparse tensor to obtain the output sparse tensor.

In an example of any of the preceding examples of the first aspect of the system, input sparse tensor may contain data points that are sparsely located in a higher dimensional space, and each data point may include coordinate information and feature information.

In an example second aspect, the present disclosure describes a system including a processor device; and a memory storing instructions that configure the processor device to compute a block of a trained neural network model, the block including a sparse inter-channel attention module. Computing the block includes: obtaining, as input to the block of the trained neural network model, an input sparse tensor; applying the sparse inter-channel attention module to the input sparse tensor by: processing the input sparse tensor using a sparse global pooling squeeze layer to obtain a set of global attention weights; processing the set of global attention weights using a sparse linear excitation layer to obtain a set of channel-wise attention weights; and applying the set of channel-wise attention weights to the input sparse tensor to obtain a scaled feature representation having inter-channel attention applied. Computing the block also includes: outputting the scaled feature representation as an output sparse tensor of the block of the trained neural network model.

In an example of preceding second aspect of the system, the block of the trained neural network model may be an encoder block of an encoder stage of the trained neural network model.

In an example of preceding second aspect of the system, the block of the trained neural network model may be a decoder block of a decoder stage of the trained neural network model.

In an example of any of the preceding examples of the second aspect of the system, the instructions may further configure the processor device to: prior to outputting the output sparse tensor, dampen the inter-channel attention by: applying, to the scaled feature representation, a damping factor to obtain a regularized scaled feature representation; and summing the regularized scaled feature representation with the input sparse tensor to obtain a summation output, the input sparse tensor having been scaled by a scaling factor complementary to the damping factor; and outputting the summation output as the output sparse tensor.

In an example of any of the preceding examples of the second aspect of the system, the input sparse tensor may contain data points that are sparsely located in a higher dimensional space, and each data point may include coordinate information and feature information.

In an example third aspect, the present disclosure describes a system including: a processor device; and a memory storing instructions that configure the processor device to compute a block of a trained neural network model, the block including a sparse residual tower module having a series of one or more sparse residual submodules. Computing the block includes: obtaining, as input to the block of the trained neural network model, an input sparse tensor; processing the input sparse tensor through the series of one or more sparse residual submodules, wherein each given sparse residual submodule comprises: a series of sparse convolution blocks including a particular sparse convolution block having a convolution kernel that causes rearrangement of data points; a skip connection having a duplicate sparse convolution block corresponding to the particular sparse convolution block; and a summation operation to sum an output of the series of sparse convolution blocks and an output of the duplicate sparse convolution block in the skip connection to obtain a sparse tensor outputted by the given sparse residual submodule. Computing the block also includes: after processing by each sparse residual submodule in the series of one or more sparse residual submodules, outputting the sparse tensor outputted by a last sparse residual submodule in the series of one or more sparse residual submodules as an output sparse tensor of the block of the trained neural network model.

In an example of preceding third aspect of the system, the block of the trained neural network model may be an encoder block of an encoder stage of the trained neural network model, and the sparse residual tower may have a series of three sparse residual submodules.

In an example of preceding third aspect of the system, the block of the trained neural network model may be a decoder block of a decoder stage of the trained neural network model, and the sparse residual tower may have a series of two sparse residual submodules.

In an example of any of the preceding examples of the third aspect of the system, other sparse convolution blocks in the series of sparse convolution blocks may have respective convolution kernels that leave the data points unchanged in order, and the duplicate sparse convolution block may have a convolution kernel with dimensions equal to the convolution kernel of the particular sparse convolution block in the series of sparse convolution blocks.

In an example of any of the preceding examples of the third aspect of the system, the particular sparse convolution block may be first in the series of convolution blocks.

In an example fourth aspect, the present disclosure describes a system including: a processor device; and a memory storing instructions that configure the processor device to execute a trained neural network model to label data points of a sparse input point cloud by: obtaining an input sparse tensor representing the sparse input point cloud; processing the input sparse tensor using an encoder stage having a series of one or more encoder blocks, wherein each encoder block is applied by applying a sparse convolution layer, followed by applying an encoder sparse intra-channel attention module, followed by an encoder sparse inter-channel attention module, and followed by an encoder sparse residual tower module; processing output from the encoder stage using a decoder stage having a series of one or more decoder blocks, wherein each decoder block is applied by applying a sparse transpose convolution layer, followed by a decoder sparse inter-channel attention module, and followed by a decoder sparse residual tower module; and obtaining, from an output of the decoder stage, an output sparse tensor representing a sparse labeled output point cloud.

In an example of preceding fourth aspect of the system, the trained neural network model may be trained to perform semantic segmentation, the sparse input point cloud may be a sparse 3D point cloud generated by a LIDAR unit, and the sparse labeled output point cloud may include semantic labels for each data point corresponding to the sparse input point cloud.

In an example of any of the preceding examples of the preceding fourth aspect of the system, the instructions may configure the processor device to apply the encoder sparse intra-channel attention module by: obtaining, as input to the sparse intra-channel attention module, a sparse tensor; applying a sparse convolution block to the sparse tensor; processing output of the sparse convolution block using a rectified linear unit; processing output of the rectified linear unit using a sigmoid function to obtain a set of intra-channel attention weights; and applying the set of intra-channel attention weights to the sparse tensor to output a processed sparse tensor having intra-channel attention applied.

In an example of any of the preceding examples of the preceding fourth aspect of the system, the instructions may configure the processor device to apply the encoder sparse inter-channel attention module or the decoder sparse inter-channel attention module by: obtaining, as input to the encoder sparse inter-channel attention module or the decoder sparse inter-channel attention module, a sparse tensor; processing the sparse tensor using a sparse global pooling squeeze layer to obtain a set of global attention weights; processing the set of global attention weights using a sparse linear excitation layer to obtain a set of channel-wise attention weights; and applying the set of channel-wise attention weights to the sparse tensor to output a scaled feature representation that is a processed sparse tensor having inter-channel attention applied.

In an example of any of the preceding examples of the preceding fourth aspect of the system, the instructions may configure the processor device to apply the encoder sparse residual tower module or the decoder sparse residual tower module by: obtaining, as input to the encoder sparse residual tower module or the decoder sparse residual tower module, a sparse tensor; processing the sparse tensor through a series of one or more sparse residual submodules, wherein each given sparse residual submodule comprises: a series of sparse convolution blocks including a particular sparse convolution block having a convolution kernel that causes rearrangement of data points; a skip connection having a duplicate sparse convolution block corresponding to the particular sparse convolution block; and a summation operation to sum an output of the series of sparse convolution blocks and an output of the duplicate sparse convolution block in the skip connection to obtain a sparse tensor outputted by the given sparse residual submodule.

In an example of any of the preceding examples of the preceding fourth aspect of the system, the trained neural network model may be based on a U-net architecture, the series of decoder blocks may match the series of one or more encoder blocks, and the transpose convolution layer of each decoder block may be a transpose of the convolution layer of a corresponding encoder block.

In an example aspect, the present disclosure describes methods performed by any of the preceding example aspects of the system.

In an example aspect, the present disclosure describes non-transitory computer readable media having instructions encoded thereon, the instructions causing the processor device to be configured in accordance with any of the preceding example aspects of the system.

BRIEF DESCRIPTION OF THE DRAWINGS

Reference will now be made, by way of example, to the accompanying drawings which show example embodiments of the present application, and in which:

FIG. 8 is a flowchart illustrating an example method for computing a block of a neural network model including a sparse intra-channel attention module, in accordance with examples disclosed herein;

FIG. 9 is a flowchart illustrating an example method for computing a block of a neural network model including a sparse inter-channel attention module, in accordance with examples disclosed herein;

FIG. 10 is a flowchart illustrating an example method for computing a block of a neural network model including a sparse residual tower module, in accordance with examples disclosed herein; and FIG. 11 is a flowchart illustrating an example method for using a trained neural network model to process an input sparse tensor, using modules disclosed herein, to perform a perception task, in accordance with examples disclosed herein.

Similar reference numerals may have been used in different figures to denote similar components.

DETAILED DESCRIPTION

Figure 1:
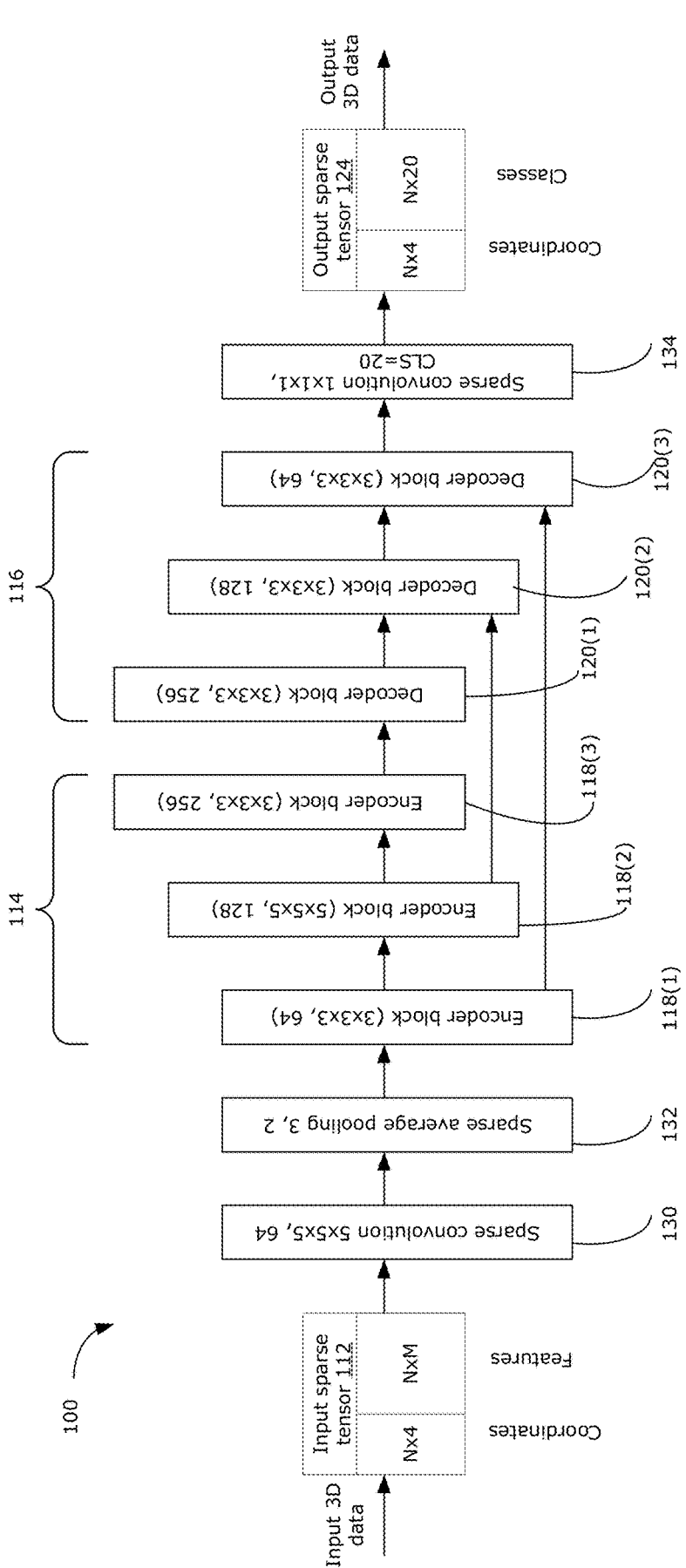
FIG. 1 is block diagram of a sparse semantic segmentation system, in accordance with examples disclosed herein.

A LIDAR sensor can be one of the primary sensors used in autonomous vehicles to sense an environment (i.e. scene) surrounding the autonomous vehicle. An autonomous vehicle generally includes an automated driving system (ADS) or advanced driver-assistance system (ADAS). The ADS or the ADAS includes a perception subsystem that processes point clouds to generate predictions which are usable by other sub systems of the ADS or ADAS for localization of the autonomous vehicle, path planning for the autonomous vehicle, motion planning for the autonomous vehicle, or trajectory generation for the autonomous vehicle.

In terms of task essence, both instance level of object detection and semantic segmentation are two key aspects of perception. More specifically, compared with detecting object or instance level, semantic segmentation is the process of partitioning a point cloud obtained from a LIDAR, or alternative visual representation into multiple segments. Each point in a segment is associated with a label or tag which is representative of the category that segment belongs to. Thus, semantic segmentation of 3D point clouds is an attempt to predict the category or class label or tag for each point of a point cloud. In the context of ADS or the ADAS, however, object detection or semantic segmentation is not totally independent. As a class label or tag for an object of interest can be generated by semantic segmentation, semantic segmentation can act as an intermediate step to enhance downstream perception tasks such as object detection and object tracking.

Point clouds are examples of unstructured data, meaning that there is no natural order to the data points. For comparison, a digital 2D image is an example of structured data, in which data points are arranged in a grid (each data point being at a defined x, y position on the grid). There is a natural order to the data points because they are arranged in rows and columns, and the neighbors of a given data point can be readily identified as those data points whose x, y position differ from the given data point by one. Unlike such structured data, the data points in unstructured data are not naturally ordered. For example, a point cloud stores its data points as a list, where each data point may contain the (x, y, z) position where reflected light was detected as well as the intensity of the reflected light from that position. However, there is no guarantee that each data point in the point cloud has defined neighbors, nor is there any guarantee that the order in which the data points are stored in the point cloud corresponds to any spatial relationship.

Accordingly, while 2D convolution has been relatively successful in generating accurate and useful predictions (e.g., semantic segmentation) for 2D images, challenges remain in extending convolution techniques to higher dimensional, unstructured data, such as for semantic segmentation of unstructured 3D point clouds.

To assist in understanding the present disclosure, some discussion of existing techniques for processing 3D point clouds to perform a prediction task (e.g., for performing semantic segmentation) is first provided.

Most existing approaches for semantic segmentation of point clouds or object detection in point clouds can be classified into 3 categories, i.e. point wise, spherical front view (SFV) or bird's eye view (BEV). PointNet [Ref 1] and Pointnet++[Ref 2] are among pioneering point wise methods, which take lists of points as input, apply input and feature transformations and then aggregate point features by max pooling, and output a list of class labels, one-to-one with the input list by applying a final multi-layer perceptron layer. These point wise methods can require extensive computational resources and can have slow inference times.

Recently, MinkowskiNet [Ref 3] proposed a 4D convolutional neural networks for spatio-temporal perception. A generalized sparse convolution is introduced along with its auto-differentiation library (ME). A sparse tensor representation is adopted due to its expressiveness and generalizability for high-dimensional spaces. However, the predictions from the 4D spatio-temporal generalized sparse CNN are not necessarily consistent throughout the space and time. To overcome these challenges in the high-dimensional 4D space, a hybrid kernel was been proposed, a special case of the generalized sparse convolution, and the trilateral-stationary conditional random field that enforces spatio-temporal consistency in the 7D space-time-chroma space.

SqueezeSeg [Ref 4] and SqueezeSegV2 [Ref 5] are typical SFV based methods. SqueezeSeg proposes a CNN-based end-to-end semantic segmentation system which takes in a range-image generated by applying spherical transformation of point cloud, and predicts point-wise label map. A conditional random field (CRF) [Ref 6] layer is used in post-processing as a recurrent layer to refine the output. SqueezeSegV2 [Ref 5], which was proposed to improve the SqueezeSeg model performance, firstly constructs a SFV image of the point cloud before segmenting it with an encoder/decoder structure using FireModule as an element layer and then refines the segments with a recurrent CRF. More specifically, SqueezeSegV2 presented a) model improvement using CAM layer to increase model robustness to dropout noise in 3D point clouds, and b) domain-adaptation training pipeline. Although fast and precise, constructing a SFV image introduces quantization error in the input (i.e. not all points make it into the SFV range-image), resulting in a loss of approximately 30% of the original point clouds.

PointSeg [Ref 7] is another projection-based method in which proposes a real-time end-to-end semantic segmentation model based upon SqueezeNet with some improvements. The model takes in spherical image as input and predicts a point-wise semantic mask as output. An Enlargement layer (Atrous Pyramid Pooling (ASPP)) and Squeeze Re-weighting (SR) layer are used to improve the performance. More specifically, a Squeeze Re-weighting layer (SR) is adopted from Squeeze-and-Excitation Networks [Ref 8], in order to obtain a more robust feature representation as efficient as possible, and exploit channel dependencies efficiently.

Although some of the known sparse convolution based processing solutions may reduce computation complexity with limited spatial geometrical information loss, they will often lose small instances with local details during multi-layer propagation. This can result in a lack of stability and/or a failure to differentiate the fine details included in point cloud data. However, in the environments in which ADS and ADAS are applied, a safety-critical perception subsystem that uses point clouds must consistently and accurately perform semantic segmentation on point clouds even with respect to small object instances.

Semantic segmentation is crucial for scene understanding in autonomous driving, particularly in the context of perception subsystem where downstream perceptions tasks, such as object detection and object tracking, rely on semantic segmentation of point clouds. Therefore, there is a need to provide systems and methods that can process 3D point clouds and perform semantic segmentation with greater accuracy. More generally, there is a desire to provide building blocks, such as neural network modules, that can be implemented in various neural network models for processing unstructured, higher dimensional data, for performing perception tasks (e.g., semantic segmentation, object classification, object segmentation, object detection and tracking, etc.).

In various examples, the present disclosure describes neural network models that include modules to enable unstructured, higher dimensional data (e.g., 3D point clouds) to be processed such that more accurate overall performance of the neural network models can be achieved. In particular, the present disclosure describes neural network models that make use of the disclosed modules for performing a perception task. In some examples, a 3D sparse convolutional neural network (CNN) model based system and method is disclosed for semantic segmentation of 3D point clouds ("3D point cloud semantic segmentation"). The examples presented in the present disclosure focus on the processing of 3D point cloud, but can also be applied to processing of other unstructured, higher dimensional data.

In the present disclosure, the term "LIDAR" (also "LiDAR" or "Lidar") refers to Light Detection And Ranging, a sensing technique in which a sensor emits laser beams and collects the location, and potentially other features, from light-reflective objects in the surrounding environment.

In the present disclosure, the term "point cloud object instance", or simply "object instance" or "instance", refers to a single definable object in a point cloud, such, as a car, house, or pedestrian, that can be defined as a single object. For example, typically a road cannot be an object instance; instead, a road may be defined within a point cloud as defining a scene type or region of the point cloud.

The terms "annotated" and "labelled" are used interchangeably to indicate association of semantic data with points of a point cloud, such as scene type labels attached to point clouds or regions thereof, or object class labels attached to object instances within a point cloud.

A "surface model" refers to a three-dimensional model of one or more surfaces of an object; the surface(s) may be represented as polygons, points, texture maps, and/or any other means of representing three-dimensional surfaces.

The present disclosure refers to "unstructured" data, meaning data in which the data points have no natural order and/or are not regularly spaced (e.g., in a grid or in a matrix fashion). The present disclosure also refers to "higher dimensional" data, meaning data representing points in a dimensional space that is higher than two dimensions, for example data representing points in three-dimensional space ("3D data") or data representing points in four-dimensional space ("4D data").

Examples disclosed herein apply sparse tensor representation and sparse convolution, which offers generalizability for high-dimensional spaces. Sparse convolution closely resembles standard convolution (i.e., 2D convolution), and can be efficient and fast as it only computes outputs for predefined coordinates and saves them into a compact sparse tensor. This can reduce both memory requirements and a number of required computation operations, relative to full tensor convolution, especially for 3D scans or other higher dimensional data formats where most of the sample space is empty.

FIG. 1 is a block diagram representation of a sparse semantic segmentation system 100 according to examples of the present disclosure. The sparse semantic segmentation system 100 is implemented as a sparse CNN model for 3D point cloud semantic segmentation. Examples of the neural network modules disclosed herein, namely the sparse intra-channel module, the sparse inter-channel module, and the sparse residual tower, will be described in the context of the sparse semantic segmentation system 100, however it should be understood that this is not intended to be limiting. As will be understood by one skilled in the art, the disclosed neural network modules may be implemented in other neural network modules for performing other perception tasks, and may be implemented independently of each other.

It should be noted that FIG. 1, and other figures described herein, indicate example dimensions for various computational blocks and an example number of computational blocks. In particular, the dimensions and number of computational blocks shown have been found to be useful for processing sparse 3D data for performing semantic segmentation. However, it should be understood that these dimensions and numbers of blocks are not intended to be limiting. For example, higher dimensional data (e.g., 4D data) may be processed using computational blocks having higher dimensionality and/or greater number of channels, among other possibilities.

The sparse semantic segmentation system 100 of FIG. 1 receives as input 3D data, such as a raw 3D point cloud (e.g., an unprocessed 3D point cloud), which has been converted into an input sparse tensor 112. The input sparse tensor 112 is a data structure that holds two types of information, namely the coordinates and the features of each data point in the point cloud. In the example of FIG. 1, for a point cloud having N data points, the resulting input sparse tensor 112 is a data structure that stores N rows of data, each row of data comprising 4 data values representing the coordinates of one data point (i.e., x, y, z position as well as the intensity of the reflect light) as well as M (e.g., 64) data values representing the feature vector of that data point. The input sparse tensor 112 may be mathematically represented as comprising a coordinate matrix of size N×4 and a feature matrix of size N×M. It should be noted that, although the input sparse tensor 112 may be represented as storing data in rows, each row corresponding to the data point, the input sparse tensor 112 is still unstructured data because there is no natural order to how the N data points are arranged in the input sparse tensor 112 nor any logical relationship between adjacent rows of the input sparse tensor 112 (e.g., data points that are close to each other in 3D space are not necessarily stored in rows that are adjacent to each other).

The sparse semantic segmentation system 100 processes the input sparse tensor 112 through various stages, discussed below, to generate an output sparse tensor 124 (which represents output 3D data, such as an output point cloud). In particular, after the sparse semantic segmentation system 100 has been trained to perform a semantic segmentation task, the output sparse tensor 124 represents a labeled 3D point cloud, in which each data point is associated with a predicted semantic label.

Processing of the input sparse tensor 112 involves performing sparse convolution. Sparse convolution is a technique that may be suitable for processing data with uneven or long-tailed distribution of data points, for example as might be found in LIDAR data where a data point might correspond to a distant (x, y, z) position with no other data points nearby.

Figure 6A:
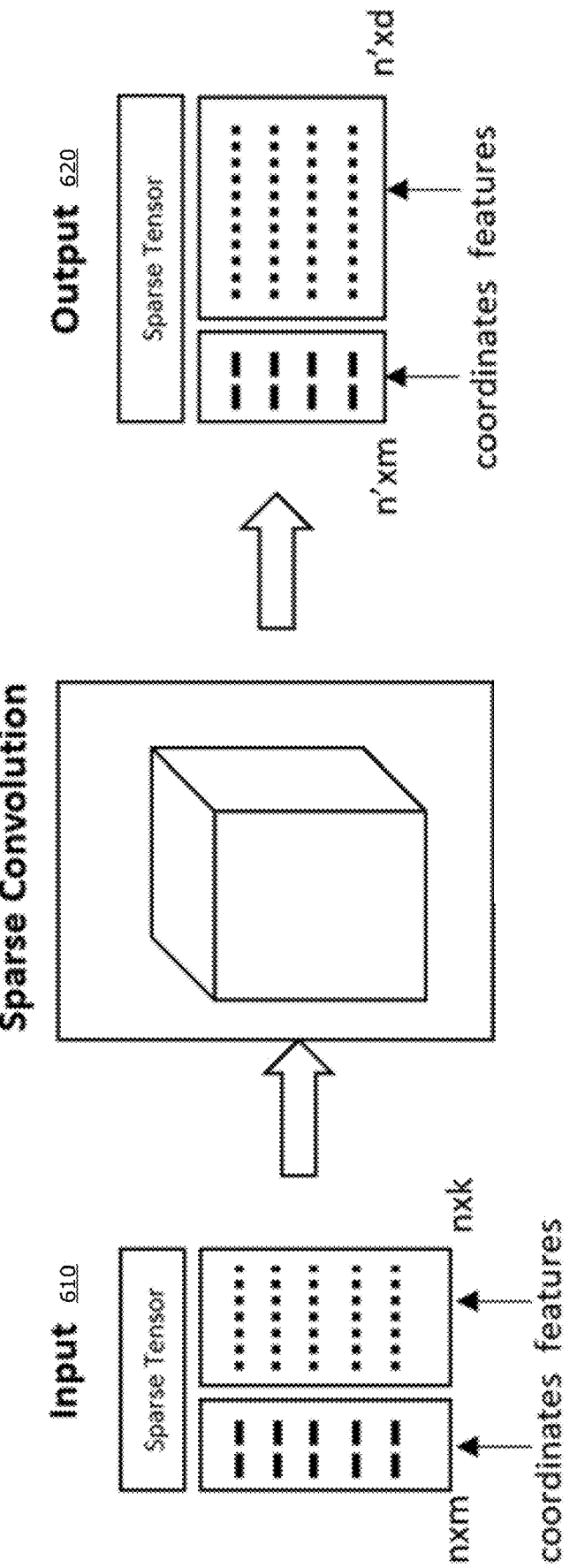
FIGS. 6A-6C illustrate an example of sparse convolution, which may be used to implement examples disclosed herein.
Figure 6B:
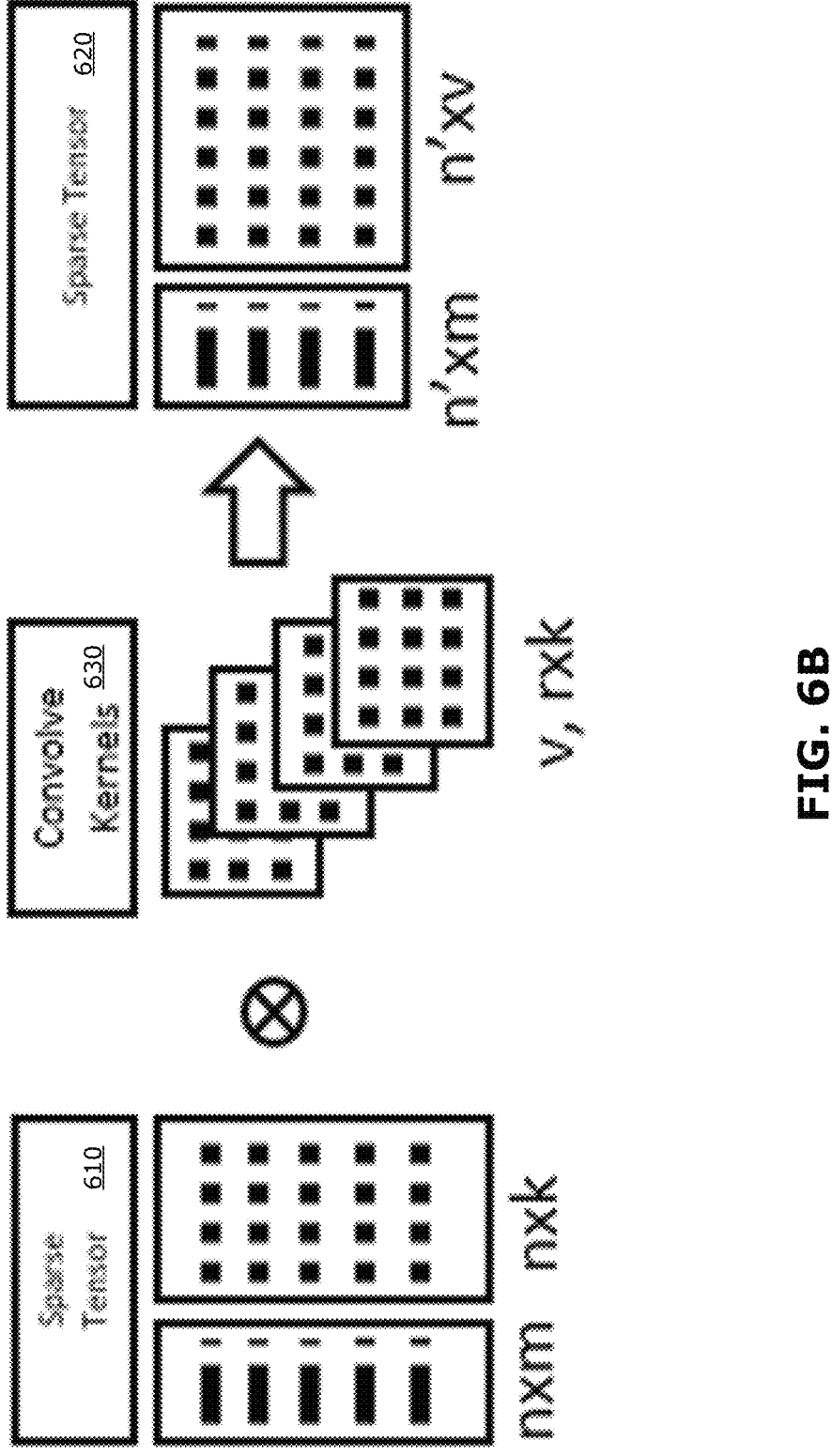
Figure 6C:
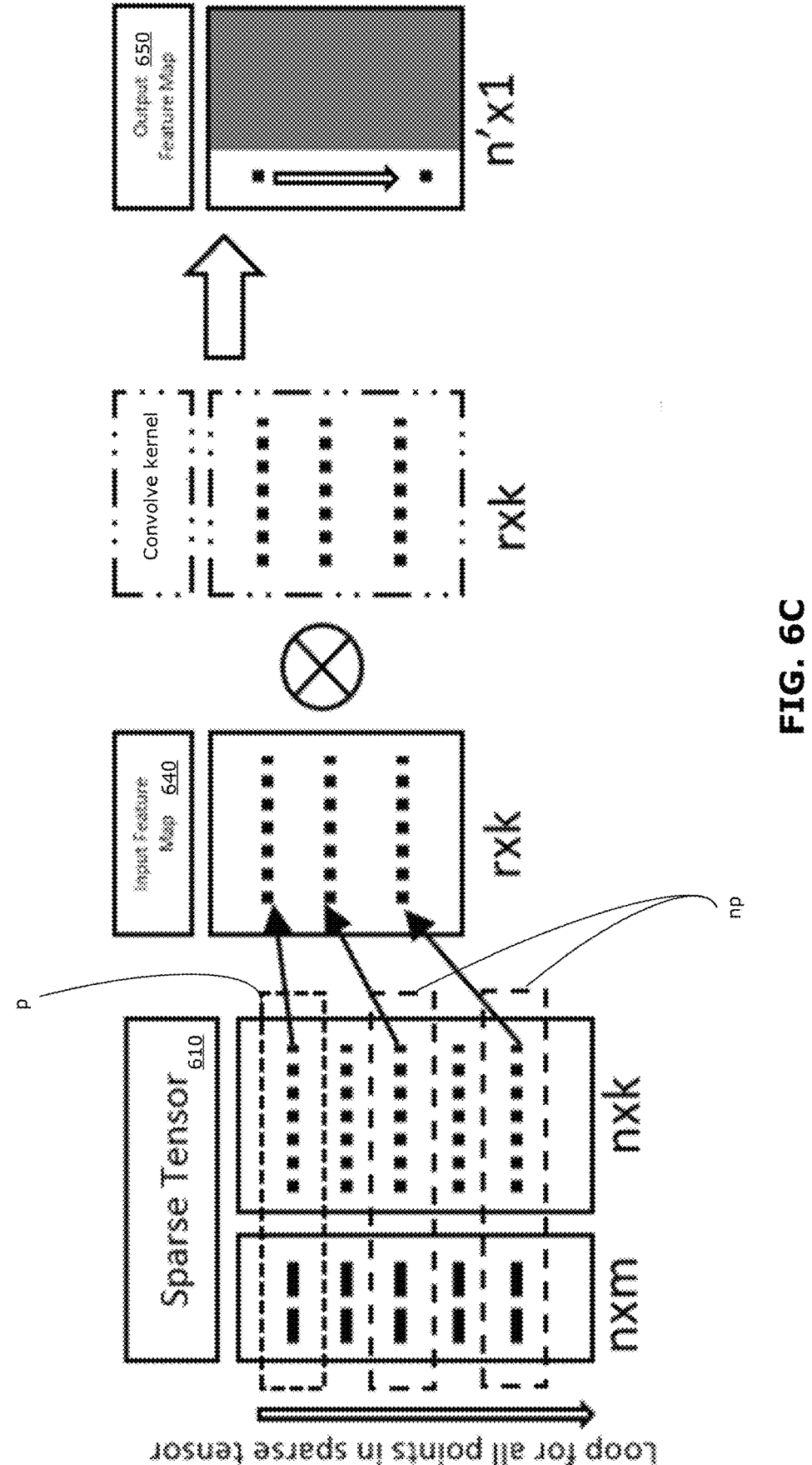

FIGS. 6A-6C provide a general overview of sparse convolution.

As shown in FIG. 6A, sparse convolution involves processing an input sparse tensor 610 to generate an output sparse tensor 620. In this example, the input sparse tensor 610 is formed by a n×m coordinate matrix and a n×k feature matrix, where n is the number of input data points, m is the dimension of the coordinates of each input data point, and k is the dimension of the features of each input data point. The output sparse tensor 620 in this example is formed by a n'×m coordinate matrix and a n'×d output matrix, where n' is the number of output data points (where n' may or may not be equal to n) and d is the dimension of the features of each output data point (where d may or may not be equal to k).

FIG. 6B illustrates how sparse convolution is performed by applying convolve kernels 630 to the input sparse tensor 610 to generate the output sparse tensor 620. In this example, there are v convolve kernels 630 applied to the input sparse tensor 610, each convolve kernel 630 having dimensions r×k, where r denotes the kernel size (e.g., if the kernel is a 3×3×3 kernel, then r is 27) and k corresponds to the dimension of the features of the input data points.

FIG. 6C illustrates further details on how sparse convolution is performed for a single data point in the input sparse tensor 610. Consider a given data point p. Performing sparse convolution for the data point p involves first performing a neighbor search among the coordinates of all the data points in the input sparse tensor 610 to find all neighbor points, relative to data point p, within the kernel radius (e.g., using the 3D Euclidean distance calculated between the coordinate of data point and the coordinate of each neighbor point). In this example, two neighbor points np have been identified.

The features of the data point p and features of neighbor points np together form the input feature map 640, which is convolved (using 1D convolution) with the convolve kernel, to generate an output feature map 650 (conceptually equivalent to feature maps or channels in conventional 2D convolutional neural networks). This process is repeated for every data point in the input sparse tensor 610, to general the output sparse tensor 620.

The result of sparse convolution on the input sparse tensor 610 is the generation of the output sparse tensor 620 that contains more feature information, reflected in a change in the dimension of the feature data of the output sparse tensor 620.

Reference is again made to FIG. 1. The sparse semantic segmentation system 100 may be designed based on a U-Net architecture, in which upsampling stages (represented by an encoder stage 114) are equally matched by downsampling stages (represented by a decoder stage 116). The encoder stage 114 includes a set of encoder blocks 118(1) to 118(Nb) (where Nb=3 in the illustrated example), generically referred to as encoder block 118, that have successively increasing numbers of channels, and the decoder stage 116 comprises a set of decoder blocks 120(1) to 120(Nb), generically referred to as decoder block 120, that have successively decreasing numbers of channels.

In the example of FIG. 1, the encoder stage 114 is preceded by a sparse convolution block 130 and a sparse average pooling block 132; and the decoder stage 116 is followed by a sparse convolution block 134. It should be noted that the use of the sparse convolution block 130 and the sparse average pooling block 132 preceding the encoder stage 114, as well as the use of the sparse convolution block 134 following the decoder stage 116, are not typically found in conventional neural network models that process 3D (or higher dimensional) data. Typically, conventional neural networks use 3D convolution (or higher dimensional convolution in the case of higher dimensional data) to process such data. In contrast, sparse convolution, as used in the present disclosure, enables faster processing of 3D (or higher dimensional) data, cutting down on the computational time and required processing power.

Figure 2:
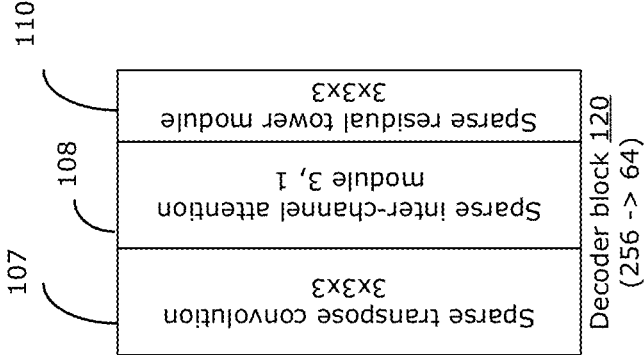
FIG. 2 is a block diagram of an example encoder block and an example decoder block, in accordance with examples disclosed herein.

As shown in FIG. 2, as will be explained in greater detail below, each encoder block 118 includes a sparse convolution layer 104, a sparse intra-channel attention module 106, a sparse inter-channel attention module 108, and a sparse residual tower module 110. Each decoder block 120 includes a sparse transpose convolution layer 107, a sparse inter-channel attention module 108, and a sparse resolution tower module 110. Each of these modules receives a sparse tensor as input and outputs a sparse tensor.

In some examples, the sparse convolution layer 104 and the sparse transpose convolution layer 107 are based on the Minkowski engine [Ref 3]. The Minkowski engine is a sparse auto differentiation library for sparse tensors and generalized sparse convolution. The sparse auto differentiation library can reduce computation complexity while maintaining spatial geometrical information.

The sparse intra-channel attention module 106 is now described with reference to FIG. 3. The sparse intra-channel attention module 106 is designed to focus attention on the features (and corresponding data point(s)) that are relevant for the perception task (e.g., for segmentation).

The sparse intra-channel attention module 106 receives a feature representation (also referred to as a feature map) in the form of an input sparse tensor 300 and outputs an output sparse tensor 310. Notably, the input sparse tensor 300 and the output sparse tensor 310 in FIG. 3 are intended to be generic sparse tensors that are the intermediate input and output of one sparse intra-channel attention module 106, and are not to be confused with the input sparse tensor 112 and output sparse tensor 124 of the sparse semantic segmentation system 100.

The sparse intra-channel attention module 106 applies attention over the local information represented in the features of the input sparse tensor 300, and performs sparse convolutions in 3D to the input sparse tensor 300 to learn a feature representation where attention is focused on the features (and corresponding data points) of relevance.

In the example shown, the input sparse tensor 300 contains data for N data points, each data point having corresponding coordinate data (x, y, z, intensity) and feature vector (e.g., 64 values in length). The output sparse tensor 310 is of a similar size, as indicated in FIG. 3. However, in the output sparse tensor 310 attention weights corresponding to the data points (each attention weight being in the range of [0,1]) have been applied, so that the feature vectors that are of lesser relevance to the perception task are given a lesser weight (e.g., a weight value closer to 0 is applied) while feature vectors that of greater relevance to the perception task are given a greater weight (e.g., a weight value closer to 1 is applied). Thus, the output sparse tensor 310 is the result of applying attention (or "masking") the data in the input sparse tensor 300, to emphasize some features over others. As well, the N data points in the output sparse tensor 310 may be in an order different from the order of the N data points in the input sparse tensor 300.

The design of the sparse intra-channel attention module 106 may be motivated by the design of a conventional class activation map (CAM) module, however a conventional CAM module is not suitable for processing unstructured higher dimensional data (e.g., 3D point cloud) because it is designed for processing 2D data using 2D convolution. As well, conventionally, the CAM module is implemented by aggregating local contextual information using max pooling. Such a procedure results in information loss.

In the sparse intra-channel attention module 106 as disclosed, a sparse convolution block 320 is used to learn better feature representation for the attention weights. The sparse convolution block 320 is followed by a rectified linear unit (ReLU) block 322 (with 1×1×1 sparse convolution) and a sigmoid block 324 (with 1×1×1 sparse convolution). This may be conceptually similar to the use of ReLU and sigmoid blocks in a conventional CAM module. Additionally, a stabilizing operation 302 is performed in which the output of the sigmoid block 324 is summed with the output of the sparse convolution block 320. The stabilizing operation 302 helps to increase the attention over an area (e.g., 9×9×9 area) around a point of attention. The stabilizing operation 302 may be useful in cases where the input sparse tensor 300 is very noisy, for example. However, it should be understood that the stabilizing operation 302 is optional and the sparse intra-channel attention module 106 can be used without the stability operation. The result of the stabilizing operation 302 is the set of attention weights, which is then applied to the input sparse tensor 300 using an element-wise multiplication operation 304. The result of applying the attention weights to the input sparse tensor 300 is the output sparse tensor 310 in which relevant features have been emphasized over less relevant features.

Returning to FIG. 2, it should be noted that the sparse intra-channel attention module 106 is included in the encoder block 118 but not in the decoder block 120. Although the sparse intra-channel attention module 106 may, in some examples, also be included in the decoder block 120, it has been found in practice that it may not be useful to do so. In the encoder block 118, used in the encoder stage 114, convolution (using the sparse convolution layer 104) extracts different features from the input sparse tensor 112. In the decoder block 120, used in the decoder stage 116, transpose convolution (using the sparse transpose convolution layer 107) processes the feature representations generated by the encoder stage 114 and up-samples those local and global feature representations to predict the semantic labels for the data points in the output sparse tensor 124. The features generated by the decoder stage 114 typically include artifacts (at least at early stages of training). Aggregating such artifact-filled features can be unhelpful or counter-productive and accordingly the sparse intra-channel attention module 106 may not be included in the decoder blocks 120.

Figure 4:
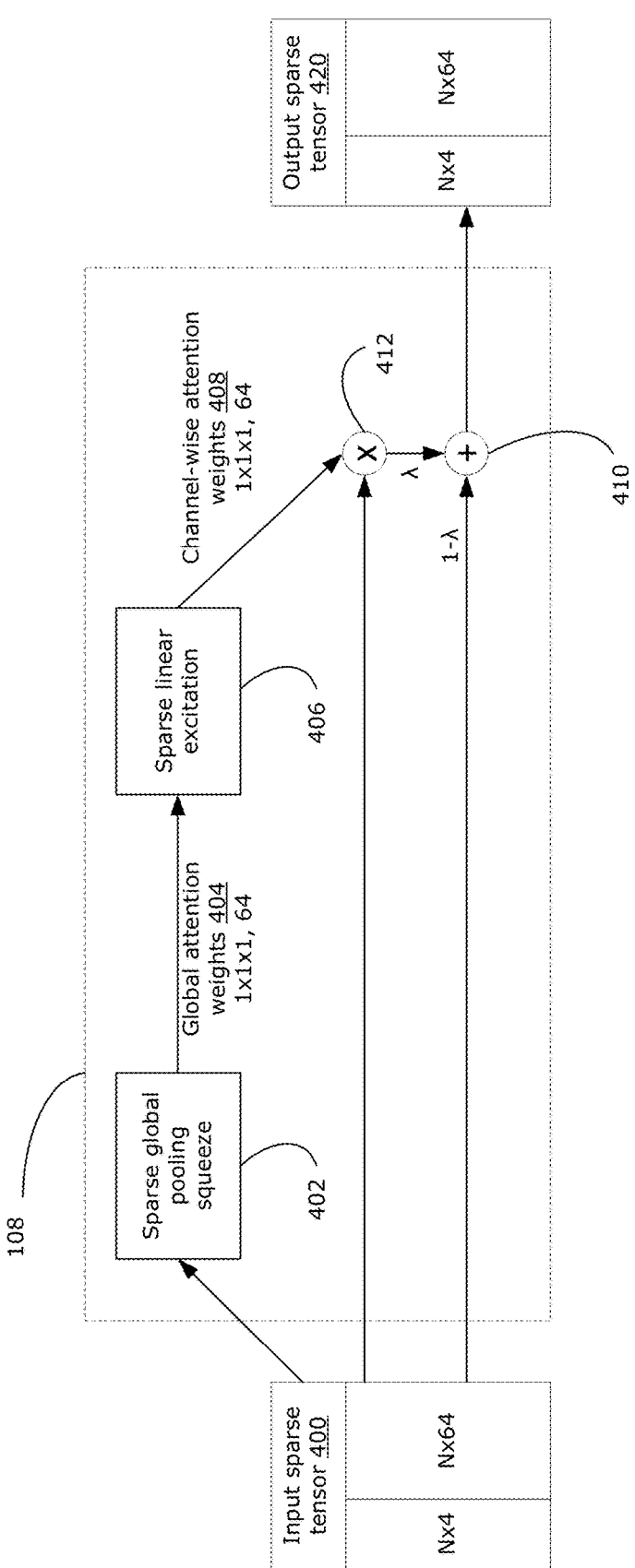
FIG. 4 is a block diagram of a sparse inter-channel attention module, in accordance with examples disclosed herein.

The sparse inter-channel attention module 108 is now described with respect to FIG. 4. The sparse inter-channel attention module 108 is designed to focus attention on the channels that are relevant for the perception task (e.g., for segmentation). In particular, when implemented in the encoder block 118 and the decoder block 120, the sparse inter-channel attention module 108 emphasizes the channel-wise feature map in each encoder block 118 and decoder block 120.

The sparse inter-channel attention module 108 receives an input sparse tensor 400 and outputs an output sparse tensor 420. Notably, the input sparse tensor 400 and the output sparse tensor 420 in FIG. 4 are intended to be generic sparse tensors that are the intermediate input and output of one sparse inter-channel attention module 108 and are not to be confused with the input sparse tensor 112 and output sparse tensor 124 of the sparse semantic segmentation system 100.

In the example shown, the input sparse tensor 400 contains data for N data points, each data point having corresponding coordinate data (x, y, z, intensity) and feature vector (e.g., 64 values in length). The output sparse tensor 420 is of a similar size, as indicated in FIG. 4. However, in the output sparse tensor 420 a set of channel-wise attention weights, comprising attention weights corresponding to the channels (e.g., 64 channels in the this example; each attention weight being in the range of [0,1]), has been applied, so that the channels that are of lesser relevance to the perception task are given a lesser weight (e.g., a weight value closer to 0 is applied) while channels that of greater relevance to the perception task are given a greater weight (e.g., a weight value closer to 1 is applied). Thus, the output sparse tensor 420 is the result of applying attention (or "masking") the data in the input sparse tensor 400, to emphasize some channels over others. As well, the N data points in the output sparse tensor 420 may be in an order different from the order of the N data points in the input sparse tensor 400.

The design of the sparse inter-channel attention module 108 may be motivated by the design of a conventional squeeze reweight (SR) module, however a conventional SR module is not suitable for processing unstructured higher dimensional data (e.g., 3D point cloud) because it is designed for processing 2D data.

In the sparse inter-channel attention module 108, the input sparse tensor 400 is first processed by a sparse global pooling squeeze layer 402 to obtain a set of global attention weights 404 that represents global information over the channels (e.g., 64 channels). Next, the set of global attention weights 404 is processed by a sparse linear excitation layer 406 to generate a set of channel-wise attention weights 408 that includes channel-wise dependencies (i.e., inter-channel dependencies). The set of channel-wise attention weights

408 contains the attention weights that place attention on certain channels over others. Channels that contain information more relevant to the perception task of interest are given greater weight than channels containing less relevant information. It may be noted that the set of channel-wise attention weights 408, in this example, is a 1×1×1, 64 tensor (i.e., having 64 channels in this example) in which all elements are attention weights that are each in the range of [0,1]. The set of channel-wise attention weights 408 is applied to the input sparse tensor 400 using an element-wise multiplication operation 412 to generate a scaled feature representation. A damping factor A is applied after the element-wise multiplication operation 412 to regularize the scaled feature representation. The value of the damping factor may be selected empirically in a range of [0,1]. For example, a value of 0.35 for the damping factor A has been found to be effective. After the regularized scaled feature representation is generated, the input feature tensor 400, with a scaling factor of (1−A) applied (where the scaling factor is complementary to the damping factor A, such that the damping factor and the scaling factor sum up to 1), is summed with the regularized scaled feature representation using a summation operation 410. The output of the summation operation is the output sparse tensor 420, in which relevant channels have been emphasized over less relevant channels.

The sparse residual tower module 110 is now described with reference to FIG. 5. The sparse residual tower module 110 is designed to further extract higher level, abstract or more global features.

The sparse residual tower module 110 comprises a set of one or more sparse residual submodules 500 (three shown in this example, but there may be greater or fewer numbers of sparse residual submodules 500 in the sparse residual tower module 110) that are connected in series (meaning the output of one sparse residual submodule 500 is fed as input to the next sparse residual submodule 500). For example, for each of the encoder blocks 118, three sparse residual submodules 500 may be used in the sparse residual tower module 110; and for each of the decoder blocks 120, two sparse residual submodules 500 may be used in the sparse residual tower module 110.

The design of the sparse residual tower module 110 may be motivated by the design of a conventional residual neural network (ResNet), which uses skip connections (or "shortcuts") to skip over some layers. The use of skip connections generally enables a neural network model to have many layers, while mitigating the problem of vanishing gradients (in which adding more layers to a deep neural network model results in difficulty in training layers that are further from the final output layer). In conventional ResNet, which is designed to process 2D data using 2D convolution, skip connections can be easily added because the order of the data points is preserved by 2D convolution and thus data points before the 2D convolution can be directly connected, via a skip connection, to data points after the 2D convolution. However, when 3D (or higher dimensional) convolution is used, the order of the data points is not necessarily preserved. Accordingly, adding a skip connection when processing data using 3D (or higher dimensional) convolution is not trivial.

The sparse residual submodule 500 addresses this problem by introducing a sparse convolution block in the skip connection. In the example of FIG. 5, the details of one sparse residual submodule 500 are shown; it should be understood that each of the sparse residual submodules 500 of the sparse residual tower module 110 may be similar to that shown.

The sparse residual submodule 500 receives an input sparse tensor 520 and outputs an output sparse tensor 530. It should be noted that, the input sparse tensor 520 and the output sparse tensor 530 in FIG. 5 are intended to be generic sparse tensors that are the intermediate input and output of one sparse residual submodule 500 and are not to be confused with the input sparse tensor 112 and output sparse tensor 124 of the sparse semantic segmentation system 100.

In the example shown, the input sparse tensor 520 contains data for N data points, each data point having corresponding coordinate data (x, y, z, intensity) and feature vector (e.g., 64 values in length). The output sparse tensor 530 contains data for M data points (where M typically does not equal N), the difference in data points being the result of the sparse convolutions performed by the layers of the sparse residual submodule 500.

In this examples, the sparse residual submodule 500 includes a series of convolution blocks 502a, 502b, 502c (generically referred to as convolution block 502). In this example, there are three such convolution blocks 502 shown, however this is only exemplary. Each convolution block 502 comprises a sparse convolution layer followed by a ReLU activation layer and a batch normalization layer. the sparse residual submodule 500 also includes a skip connection 504 that skips the convolution blocks 502. To ensure that the data points carried over the skip connection 504 are aligned with the data points resulting from the convolution blocks 502, a duplicate convolution block 506 is introduced in the skip connection 504. Notably, the duplicate convolution block 506 that is used in the skip connection 504 performs the same sparse convolution as the first convolution block 502a in the series of convolution blocks 502 (e.g., the duplicate convolution block 506 has a kernel size of the same dimension as the kernel of the first convolution block 502a; however the kernel weights of the duplication convolution block 506 may be different from the kernel weights of the first convolution block 502a). It should be noted that, in the series of convolution blocks 502, only the first convolution block 502a has a kernel size greater than 1×1×1 and both the second and third convolution blocks 502b, 502c have the kernel size 1×1×1. This means that only the first convolution block 502a will cause the data points to be rearranged and the other convolution blocks 502b, 502c leave the order of the data points unchanged. Thus it is sufficient for the skip connection 504 to include the duplicate convolution block 506 corresponding to only the first convolution block 502a.

More generally, the duplicate convolution block 506 in the skip connection 504 corresponds to (i.e., has the same convolution kernel size as) the particular convolution block 502 in the series of convolution blocks 502 that has a convolution kernel that causes rearrangement of data points (e.g., a convolution kernel larger than 1×1×1 in the case of 3D data, or a convolution kernel larger than 1×1×1×1 in the case of 4D data, etc.). Although FIG. 5 shows the first convolution block 502a as being the particular convolution block 502 having a kernel larger than 1×1×1, this is not intended to be limiting. For example, if the second convolution block 502b is the particular convolution block 502 having a kernel larger than 1×1×1, then the duplicate convolution block 506 in the skip connection 504 should correspond to the second convolution block 502b. Further, if there are two (or more) convolution blocks 502 in the series of convolution blocks 502 that have kernels larger than 1×1×1, the skip connection 504 may include corresponding two (or more) duplicate convolution blocks 506. However, for practical implementation, it may be more efficient and/or computationally simpler to have a kernel larger than 1×1×1 in only the first convolution block 502a.

The addition of the duplicate convolution block 506 in the skip connection 504 thus addresses the problem of mismatched data points (due to the 3D convolution). The data points of the skip connection 504 are summed with the output of the convolution blocks 502 using a summation operation 508, to generate the output sparse tensor 530.

Reference is again made to FIG. 1. The sparse semantic segmentation system 100 illustrates an example implementation of a neural network model that uses the sparse intra-channel attention module 106, the sparse inter-channel attention module 108 and the sparse residual tower module 110 as disclosed herein. In particular, the disclosed modules 106, 108, 110 are used to build us the encoder blocks 118 and the decoder blocks 120 as depicted in FIG. 2.

Based on a U-Net architecture, the sparse semantic segmentation system 100 uses corresponding encoder and decoder blocks 118, 120 to concatenate the features. The semantic labels for the data points are predicted by the last sparse convolution block 134 of the sparse semantic segmentation system 100, in which the features are converted into the corresponding semantic classes. The resulting output sparse tensor 124 thus includes class labels for each of the N data points. The output sparse tensor 124 may be outputted as labeled 3D data (e.g., labeled 3D point cloud).

In the sparse semantic segmentation system 100, the sparse intra-channel attention module 106 of each encoder block 118 serves to gather sparse tensor features and aggregate local information within the local feature columns, to emphasize relevant sparse tensor features. The sparse inter-channel attention module 108, in each encoder block 118 and decoder block 120, emphasizes the different feature channels, after the feature concatenation. The sparse residual tower module 110 includes sparse residual submodules 500 in which the skip connection 504 includes a convolution block 506 to map the residual coordinates to the input coordinates.

The sparse semantic segmentation system 100 may be trained using supervised training in an end-to-end manner. For example, a training dataset with ground-truth labeled point clouds may be used to train the sparse semantic segmentation system 100, using any suitable machine learning techniques (e.g., gradient back propagation). The trained sparse semantic segmentation system 100 may then be used to process unlabeled 3D point clouds and output semantically segmented 3D point clouds. The trained sparse semantic segmentation system 100 may be used as part of an ADS or ADAS system of an autonomous or semi-autonomous vehicle, for example.

Figure 7:
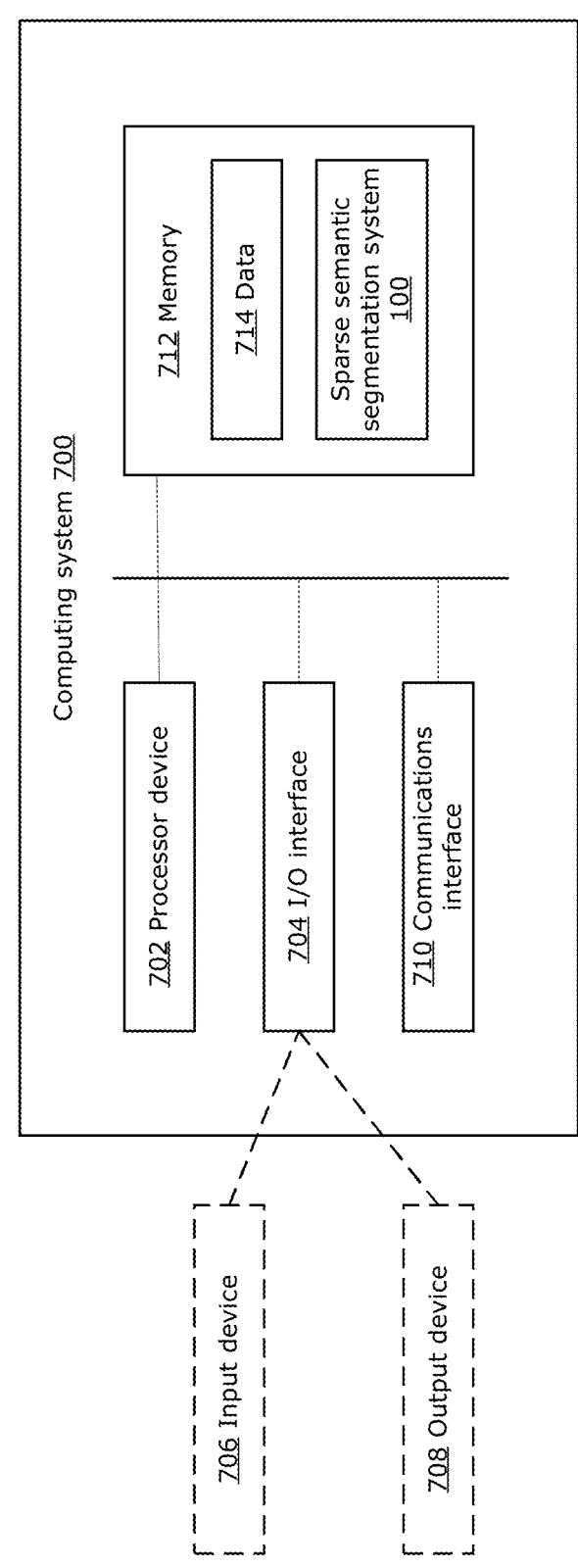
FIG. 7 is a block diagram illustrating an example computing system, which may be used to implement examples disclosed herein.

FIG. 7 is a block diagram illustrating an example hardware structure of a computing system 700 that is suitable for implementing embodiments described herein. The computing system 700 may, in some examples, be implemented in an autonomous or semi-autonomous vehicle. Examples of the present disclosure may be implemented in other computing systems, which may include components different from those discussed below. The computing system 700 may be used to execute a trained sparse semantic segmentation system 100, as disclosed herein, or any neural network model implemented using any of the disclosed sparse intra-channel attention module 106, the disclosed sparse inter-channel attention module 108 and/or the sparse residual tower module 110. The computing system 700 may also be used to train the sparse semantic segmentation system 100 or other neural network model implementing any of the disclosed modules 106, 108 and/or 110.

Although FIG. 7 shows a single instance of each component, there may be multiple instances of each component in the computing system 700. Further, although the computing system 700 is illustrated as a single block, the computing system 700 may be a single physical machine or device (e.g., implemented as a single computing device, such as a single workstation, single end user device, single server, etc.), or may comprise a plurality of physical machines or devices (e.g., implemented as a server cluster). For example, the computing system 700 may represent a group of servers or cloud computing platform providing a virtualized pool of computing resources (e.g., a virtual machine, a virtual server).

The computing system 700 includes at least one processor device 702 (e.g., one or more processors devices 702, each of which having one or more processor cores), such as a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 700 may include an input/output (I/O) interface 704, which may enable interfacing with an optional input device 706 and/or an optional output device 708. In the example shown, the optional input device 706 (e.g., a camera, a keyboard, a mouse, a microphone, a touchscreen, and/or a keypad) and optional output device 708 (e.g., a display, a speaker and/or a printer) are shown as optional and external to the computing system 700. In other example embodiments, there may not be any input device 706 and output device 708, in which case the I/O interface 704 may not be needed. In some examples, one or more sensor units (e.g., LIDAR unit, radar unit, etc.) may be an input device 706.

The computing system 700 may include an optional communications interface 710 for wired or wireless communication with other computing systems (e.g., other computing systems in a network). The communications interface 710 may include wired links (e.g., Ethernet cable) and/or wireless links (e.g., one or more antennas) for intra-network and/or inter-network communications.

The computing system 700 may include one or more memories 712 (collectively referred to as memory 712), which may include a volatile or non-volatile memory (e.g., a flash memory, a random access memory (RAM), and/or a read-only memory (ROM)). The non-transitory memory 712 may store instructions for execution by the processor device 702, such as to carry out examples described in the present disclosure. For example, the memory 712 may store instructions for implementing any of the networks and methods disclosed herein. For example, the memory 712 may store instructions for implementing the sparse semantic segmentation system 100, or other neural network model. For example, the memory 712 may store instructions for executing any of the methods discussed below, as part of execution of a neural network model. The memory 712 may include other software instructions, such as for implementing an operating system (OS) and other applications/functions.

The memory 712 may also store other data 714 (e.g., 2D data, 3D data, etc.), information, rules, policies, and machine-executable instructions described herein, including learned values for the weights of a neural network model.

In some examples, the computing system 700 may also include one or more electronic storage units (not shown), such as a solid state drive, a hard disk drive, a magnetic disk drive and/or an optical disk drive. In some examples, data and/or instructions may be provided by an external memory (e.g., an external drive in wired or wireless communication with the computing system 700) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 712 to implement data storage, retrieval, and caching functions of the computing system 700. The components of the computing system 700 may communicate with each other via a bus, for example.

As previously mentioned, it should be understood that the sparse intra-channel attention module 106, the sparse inter-channel attention module 108 and the sparse residual tower module 110 disclosed herein may be implemented in any suitable neural network model and independently of each other. For example, a neural network model that is trained to perform any perception task (e.g., object detection, panoptic segmentation, etc.) using unstructured higher dimensional input data may benefit from using any of the disclosed modules 106, 108, 110 individually or together. A neural network model that uses any of the disclosed modules 106, 108 and/or 110 may be based on a U-net architecture (i.e., having matching encoder and decoder stages) or any other suitable architecture.

For example, a neural network model that is designed to perform image segmentation on sparse higher dimensional data may benefit from using the sparse intra-channel attention module 106 in its architecture. When the neural network model has been trained, the sparse intra-channel attention module 106 may enable the neural network model to place more attention on the data points in the sparse higher dimensional data that provide information useful to the image segmentation task.

In another example, a neural network model that is designed to process sparse higher dimensional data (e.g., for an object detection task), where the sparse higher dimensional data includes data in visible light image channels and data in infrared image channels, may benefit from using the sparse inter-channel attention module 108 in its architecture. When the neural network model has been trained, the sparse inter-channel attention module 108 may enable the neural network model to place more attention on the data in the visible light image channels when the sparse higher dimensional data represents data obtained in bright daylight, and to place more attention on the data in the infrared image channels when the sparse higher dimensional data represents data obtained at night.

In another example, a neural network model that uses many convolutional layers to process sparse higher dimensional data (e.g., for an image classification task) may benefit from using the sparse residual tower module 110 to avoid the problem of gradient vanishing or exploding. The sparse residual tower module 110 may be used in place of a convolutional layer to enable skip connections to be introduced that can improve the gradient vanishing or exploding problem.

Although some examples have been described above, one skilled in the art would understand there are many different ways in which the disclosed modules 106, 108, 110 may be used, individually or in combination, to improve the performance of neural network models.

FIG. 8 is a flowchart illustrating an example method 800 for processing an input sparse tensor using a neural network model that includes a sparse intra-channel attention module 106 as disclosed herein. The method 800 may be used to compute a block of the neural network model, in which the block includes the sparse intra-channel attention module 106. The neural network model may have been trained (e.g., using supervised training) to perform a perception task using unstructured higher dimensional data (e.g., 3D point cloud) as input. The method 800 may be performed by the computing system 700 (e.g., using the processor device 702), for example.

At 802, an input sparse tensor is obtained as input to the block of the neural network model. In general, the input sparse tensor may represent a feature map in which each data point includes coordinate information (representing the location of the data point in higher dimensional space, such as 3D space) and feature information (e.g., a feature vector). In some examples, the input sparse tensor may be the output from a prior layer or block of the neural network model. In some examples, the input sparse tensor may be the output from a preprocessing module (e.g., to preprocess unstructured, higher dimensional data such as a point cloud into the sparse tensor data structure).

At 804, the input sparse tensor is processed by applying the sparse intra-channel attention module 106 to the input sparse tensor. Performing the step 804 involves performing steps 806-814. Steps 806-814 will be described with reference to both FIG. 3 and FIG. 8.

At 806, a sparse convolution block (e.g., the sparse convolution block 320 shown in FIG. 3) is applied to the input sparse tensor. Applying the sparse convolution block may involve performing sparse convolution using the library provided by the Minkowski engine.

Figure 3:
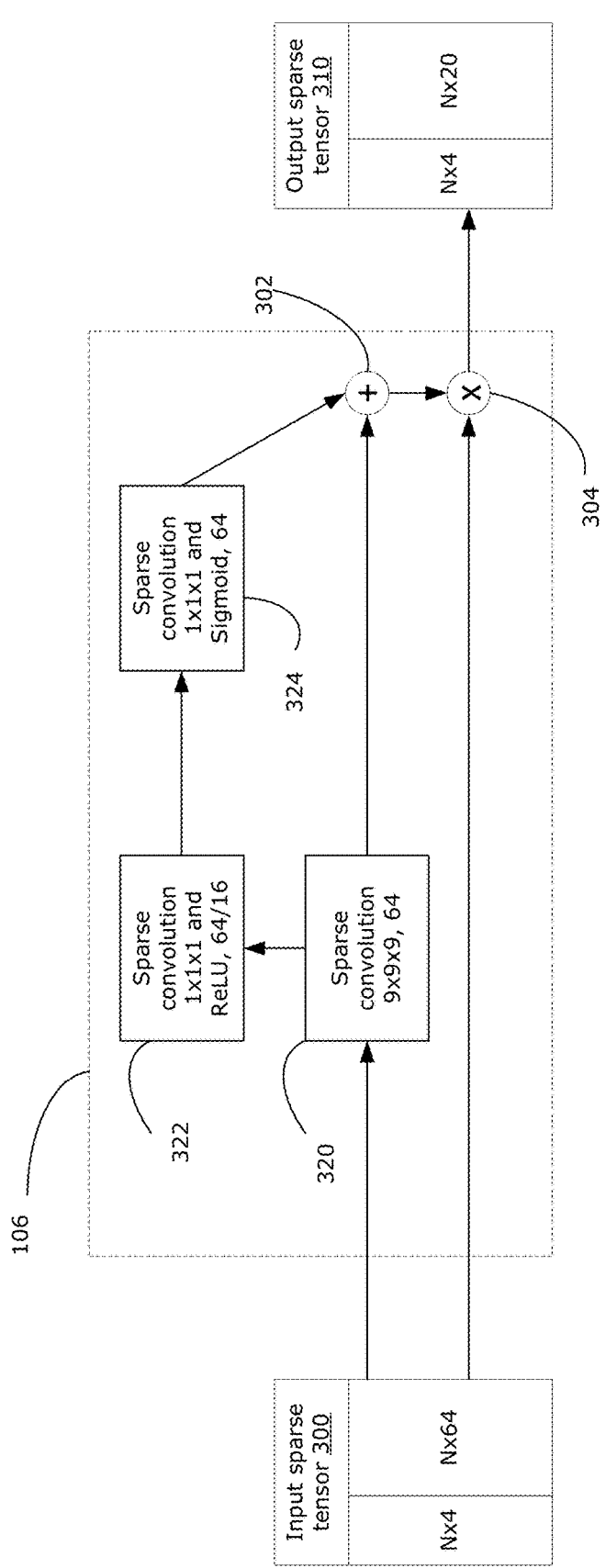
FIG. 3 is a block diagram of a sparse intra-channel attention module, in accordance with examples disclosed herein.

At 808, the output of the sparse convolution block is processed using a rectified linear unit (e.g., the ReLU block 322 shown in FIG. 3).

At 810, the output of the ReLU is processed using a sigmoid function (e.g., using the sigmoid block 324 shown in FIG. 3). The output of the sigmoid function may be used as the set of intra-channel attention weights. The intra-channel attention weights correspond to the coordinates of the data points of the input sparse tensor. The attention weights (which may each have a value in the range of [0,1]) serve to give greater weight to features that are of greater relevance (e.g., more relevant or useful for performing the perception task for which the neural network model has been trained) and less weight to features of lesser relevance.

Optionally, at 812, the output of the sigmoid function (i.e., the intra-channel attention weights) may be summed with the output of the sparse convolution block to stabilize the intra-channel attention weights (e.g., at the stabilizing operation 302 shown in FIG. 3). This stabilizing step may be useful to enforce layer stability during learning, for example by spreading the attention weights over a larger neighboring area (according to the kernel size of the sparse convolution block).

At 814, the set of intra-channel attention weights (optionally after stabilizing at step 812) is applied to the input sparse tensor (e.g., using an element-wise multiplication operation 304 shown in FIG. 3), to obtain an output sparse tensor.

At 816, the output sparse tensor, with intra-channel attention applied, is outputted. The output sparse tensor may be outputted as the computed output of a block of the neural network model, for example, or as the computed output of a layer or module within the block.

The output sparse tensor may be further processed by subsequent layers or blocks of the neural network model, in order for the neural network model to perform the perception task for which it has been trained (e.g., semantic segmentation, object identification, object classification, etc.). For example, the method 800 may be performed at an encoder stage of the neural network model, where the sparse intra-channel attention module is part of an encoder block (e.g., the encoder block 118 shown in FIG. 2).

FIG. 9 is a flowchart illustrating an example method 900 for processing an input sparse tensor using a neural network model that includes a sparse inter-channel attention module 108 as disclosed herein. The method 900 may be used to compute a block of the neural network model, in which the block includes the sparse inter-channel attention module 108. The neural network model may have been trained (e.g., using supervised training) to perform a perception task using unstructured higher dimensional data (e.g., 3D point cloud) as input. The method 900 may be performed by the computing system 700 (e.g., using the processor device 702), for example.

At 902, an input sparse tensor is obtained. In general, the input sparse tensor may represent a feature map in which each data point includes coordinate information (representing the location of the data point in higher dimensional space, such as 3D space) and feature information (e.g., a feature vector). In some examples, the input sparse tensor may be the output from a prior layer or block of the neural network model. In some examples, the input sparse tensor may be the output from a preprocessing module (e.g., to preprocess unstructured, higher dimensional data such as a point cloud into the sparse tensor data structure).

At 904, the input sparse tensor is processed by applying the sparse inter-channel attention module 108 to the input sparse tensor. Performing the step 904 involves performing steps 906-912. Steps 906-912 will be described with reference to both FIG. 4 and FIG. 9.

At 906, the input sparse tensor is processed using a sparse global pooling squeeze layer (e.g., the sparse global pooling squeeze layer 402 shown in FIG. 4) to obtain a set of global attention weights. The set of global attention weights encodes global information over all the channels of the input sparse tensor.

At 908, the set of global attention weights is processed using a sparse linear excitation layer (e.g., the sparse linear excitation layer 406 shown in FIG. 4) to obtain a set of channel-wise attention weights. The set of channel-wise attention weights encodes channel-wise dependencies. The set of channel-wise attention weights contains attention weights that place attention on certain channels over others. The channel-wise attention weights correspond to the channels of the input sparse tensor. The attention weights (which may each have a value in the range of [0,1]) serve to give greater weight to channels that are of greater relevance (e.g., more relevant or useful for performing the perception task for which the neural network model has been trained) and less weight to channels of lesser relevance.

At 910, the set of channel-wise attention weights is applied to the input sparse tensor. For example, the set of channel-wise attention weights is applied to the input sparse tensor using element-wise multiplication (e.g., the element-wise multiplication operation 412 shown in FIG. 4). If optional step 912 is not performed, the result of step 910 may be outputted at step 914 as the output sparse tensor.

Optionally, at 912, a damping factor may be applied to dampen (or regularize) the effect of applying inter-channel attention. This damping factor may be used to help improve stability during learning, for example by ensuring that channels are not excessively over-emphasized or excessively de-emphasized. The damping factor A may be applied by scaling the output of the element-wise multiplication (at step 910) to obtain a regularized scaled feature representation. The regularized scaled feature representation may be summed (e.g., using the summation operation 410 shown in FIG. 4) with the input sparse tensor (scaled by a complementary scaling factor of $(1-\lambda)$), to obtain the output sparse tensor.

At 914, the output sparse tensor, with inter-channel attention applied, is outputted. The output sparse tensor may be outputted as the computed output of a block of the neural network model, for example, or as the computed output of a layer or module within the block.

The output sparse tensor may be further processed by subsequent layers or blocks of the neural network model, in order for the neural network model to perform the perception task for which it has been trained (e.g., semantic segmentation, object identification, object classification, etc.). For example, the method 900 may be performed at an encoder stage of the neural network model, where the sparse inter-channel attention module is part of an encoder block (e.g., the encoder block 118 shown in FIG. 2); and/or may be performed at a decoder stage of the neural network model, where the sparse inter-channel attention module is part of a decoder block (e.g., the decoder block 120 shown in FIG. 2).

FIG. 10 is a flowchart illustrating an example method 1000 for processing an input sparse tensor using a neural network model that includes a sparse residual tower module 110 as disclosed herein. The method 1000 may be used to compute a block of the neural network model, in which the block includes the sparse residual tower module 110. The neural network model may have been trained (e.g., using supervised training) to perform a perception task using unstructured higher dimensional data (e.g., 3D point cloud) as input. The method 1000 may be performed by the computing system 700 (e.g., using the processor device 702), for example.

At 1002, an input sparse tensor is obtained. In general, the input sparse tensor may represent a feature map in which each data point includes coordinate information (representing the location of the data point in higher dimensional space, such as 3D space) and feature information (e.g., a feature vector). In some examples, the input sparse tensor may be the output from a prior layer or block of the neural network model. In some examples, the input sparse tensor may be the output from a preprocessing module (e.g., to preprocess unstructured, higher dimensional data such as a point cloud into the sparse tensor data structure).

At 1004, the input sparse tensor is processed by applying the sparse residual tower module 110. In particular, applying the sparse residual tower module 110 involves processing the input sparse tensor through a series of one or more sparse residual submodules 500 that are connected in series (i.e., the output of one sparse residual submodule is the input to the immediately following sparse residual submodule). Performing the step 1004 involves applying each sparse residual submodule 500 at step 1006. Performing step 1006 involves performing steps 1008-1016 for each sparse residual submodule. Steps 1008-1016 will be described with reference to both FIG. 5 and FIG. 10.

Optionally, at 1008, a sparse tensor is obtained from a preceding sparse residual submodule 500. Step 1008 may be omitted if there is no preceding sparse residual submodule 500 (e.g., there is only one sparse residual submodule 500 in the sparse residual tower module 110, or step 1006 is being performed for the first sparse residual submodule 500 in the series of sparse residual submodules 500).

Figure 5:
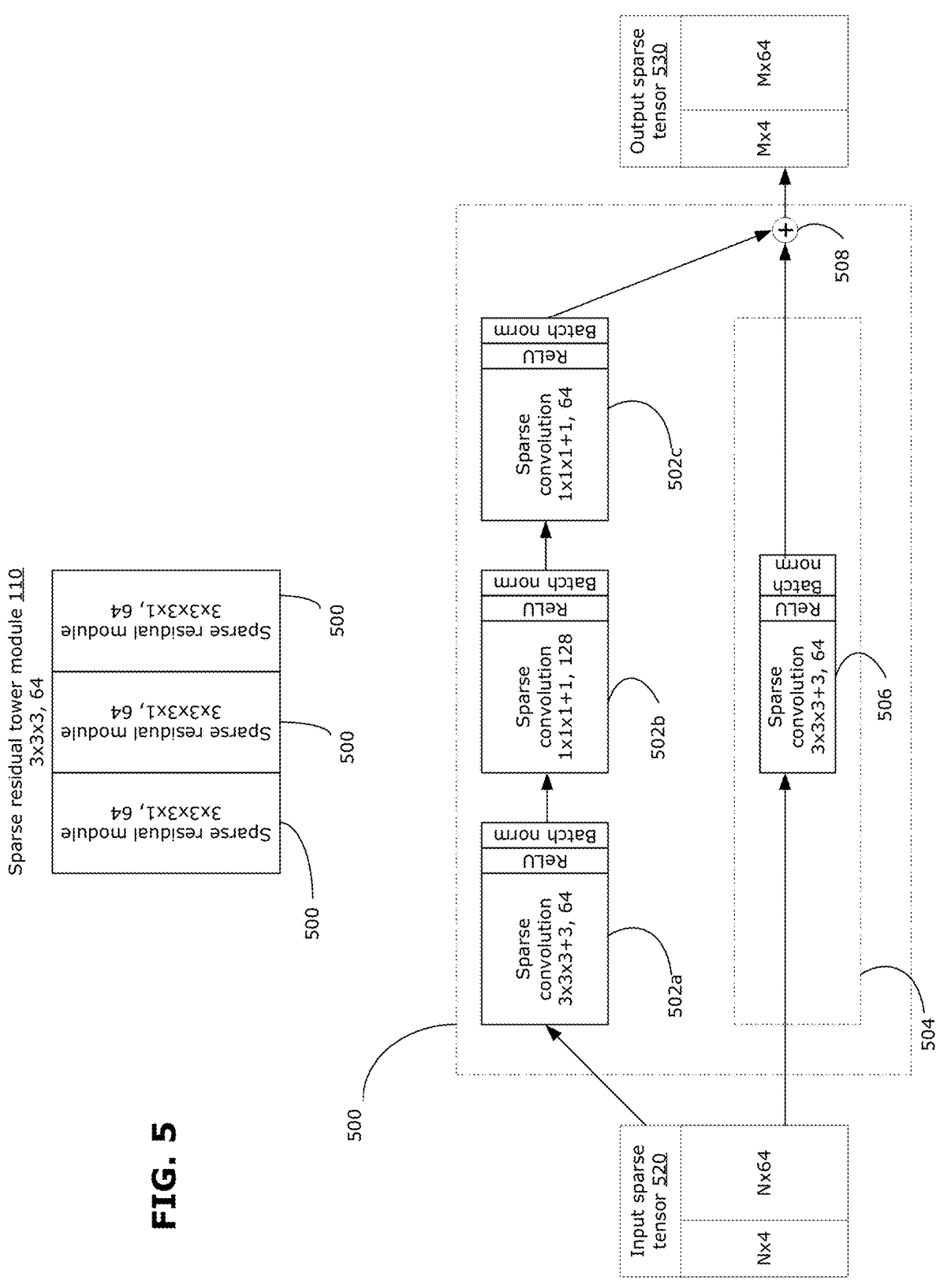
FIG. 5 is a block diagram of a sparse resolution tower module, in accordance with examples disclosed herein.

At 1010, the input sparse tensor is processed using a series of one or more sparse convolution blocks (e.g., a series of one or more sparse convolution blocks 502 as shown in FIG. 5). Each sparse convolution block may perform sparse convolution using the library provided by the Minkowski engine. For example, each sparse convolution block may comprise a sparse convolution layer followed by a ReLU activation layer and a batch normalization layer. The series of sparse convolution blocks includes at least one particular convolution block having a convolution kernel that causes rearrangement of the data points, when applied to the sparse tensor. In some examples, only one particular convolution block in the series may use a convolution kernel that causes rearrangement of data points (e.g., a convolution kernel larger than 1×1×1, in the case of 3D data, will cause data points to be rearranged). For example, only the first sparse convolution block in the series may use a convolution kernel that causes rearrangement of data points.

At 1012, in a skip connection, the input sparse tensor is processed using a duplicate sparse convolution block (e.g., the duplicate sparse convolution block 506 in the skip connection 504 as shown in FIG. 5) that corresponds to the particular sparse convolution block in the series of sparse convolution blocks used at the step 1010.

At 1014, the output of the series of sparse convolution blocks is summed with the output of the sparse convolution block in the skip connection.

Optionally, at 1016, the summed result from step 1014 may be provided as input to the next sparse residual submodule 500. Step 1016 may be omitted if there is no next sparse residual submodule 500 (e.g., there is only one sparse residual submodule 500 in the sparse residual tower module 110, or step 1006 is being performed for the last sparse residual submodule 500 in the series of sparse residual submodules 500).

At 1018, the output sparse tensor, after being processed by the series of sparse residual submodules 500, is outputted. The output sparse tensor may be outputted as the computed output of a block of the neural network model, for example, or as the computed output of a layer or module within the block.

The output sparse tensor may be further processed by subsequent layers or blocks of the neural network model, in order for the neural network model to perform the perception task for which it has been trained (e.g., semantic segmentation, object identification, object classification, etc.). For example, the method 1000 may be performed at an encoder stage of the neural network model, where the sparse residual tower module 110 is part of an encoder block (e.g., the encoder block 118 shown in FIG. 2); and/or may be performed at a decoder stage of the neural network model, where the sparse residual tower module 110 is part of a decoder block (e.g., the decoder block 120 shown in FIG. 2).

FIG. 11 is a flowchart illustrating an example method 1100 for processing an input sparse tensor (e.g., representing a 3D point cloud) using trained neural network model that includes the sparse intra-channel attention module 106, the sparse inter-channel attention module 108 and the sparse residual tower module 110. For example, the method 1100 may be performed to implement the sparse semantic segmentation system 100 shown in FIG. 1. FIG. 11 is discussed with reference to FIG. 1 as an example, however this is not intended to be limiting. The method 1100 may be performed to implement any other neural network model that makes use of a similar encoder stage 114 and decoder stage 116 in a similar U-net architecture. The neural network model may have been trained (e.g., using supervised training) to perform a perception task (e.g., semantic segmentation) using unstructured higher dimensional data (e.g., 3D point cloud) as input. The method 1100 may be performed by the computing system 700 (e.g., using the processor device 702), for example.

At 1102, an input sparse tensor is obtained. The input sparse tensor represents unstructured higher dimensional data (e.g., a 3D point cloud). The input sparse tensor may be obtained from a preprocessing module, for example, that preprocesses the unstructured higher dimensional data into a sparse tensor data structure.

Optionally, at 1104, the input sparse tensor may be processed using a sparse convolution block and a sparse average pooling block (e.g., the sparse convolution block 130 and sparse average pooling block 132 as shown in FIG. 1). In some examples, the sparse convolution block and sparse average pooling block may be omitted from the neural network model and step 1104 may not be performed. In some examples, the sparse convolution block and sparse average pooling block may be replaced with other neural network layers, and step 1104 may be replaced with a different step to process the input sparse tensor using those other neural network layers.

At 1106, the input sparse tensor (optionally after being processed by the sparse convolution block and sparse average pooling block at step 1104) is processed using an encoder stage. The encoder stage includes a series of one or more encoder blocks. For example, as shown in FIG. 1, the encoder stage 114 may include three encoder blocks 118. Processing the input sparse tensor through the encoder stage involves passing the sparse tensor through the encoder blocks in series, meaning that the output of one encoder block is fed as input to the next encoder block until all encoder blocks in the encoder stage have been applied. Applying each encoder block involves performing step 1108.

At 1108, applying each encoder block involves applying a sparse convolution layer 104, followed by a sparse intra-channel attention module 106, followed by a sparse inter-channel attention module 108 and followed by a sparse residual tower module 110, for example as shown in FIG. 2. The sparse convolution layer 104 may be applied using the library provided by the Minkowski engine; the sparse intra-channel attention module 106 may be applied using the method 800; the sparse inter-channel attention module 108 may be applied using the method 900; and the sparse residual tower module 110 may be applied using the method 1000.

At 1110, after processing by the encoder stage the output of the encoder stage is processed using a decoder stage. The decoder stage includes a series of one or more decoder blocks. In particular, if the neural network model is based on a U-net architecture, the decoder blocks in the decoder stage match (in terms of number and dimensions) the encoder blocks of the encoder stage. In particular, each decoder block may perform a deconvolution (or transpose convolution) that mirrors (or undo) the convolution performed by a corresponding encoder block. For example, as shown in FIG. 1, the decoder stage 116 may include three decoder blocks 120 corresponding to the three encoder blocks 118 of the encoder stage 114. Similar to the encoder stage, the decoder blocks are arranged in series, such that the output of one decoder block 120 is fed as input to the next decoder block until all decoder blocks in the decoder stage have been applied. Applying each decoder block involves performing step 1112.

At 1112, applying each decoder block involves applying a sparse transpose convolution layer 107, followed by a sparse inter-channel attention module 108 and followed by a sparse residual tower 110, for example as shown in FIG. 2. The sparse transpose convolution layer 107 of each decoder block is a transpose of the convolution layer 104 of a corresponding encoder block (based on U-net architecture). The sparse transpose convolution layer 107 may be applied using the library provided by the Minkowski engine; the sparse inter-channel attention module 108 may be applied using the method 900; and the sparse residual tower module 110 may be applied using the method 1000.

Optionally, at 1114, the output of the decoder stage may be processed using a sparse convolution block (e.g., the sparse convolution block 130 and sparse average pooling block 134 as shown in FIG. 1). In some examples, the sparse convolution block may be omitted from the neural network model and step 1114 may not be performed. In some examples, the sparse convolution block may be replaced with another neural network layer, and step 1114 may be replaced with a different step to process the input sparse tensor using that other neural network layer.

At 1116, an output sparse tensor is generated. The output sparse tensor may be the output from the operation sparse convolution block at step 1114, for example. The output sparse tensor may contain the data points of the input sparse tensor, augmented with predicted labels. For example, if the neural network model has been trained to perform a semantic segmentation task, the output sparse tensor may include predicted semantic labels for each data point of the input sparse tensor.

The sparse intra-channel attention module, sparse inter-channel attention module and sparse residual tower module, as discussed herein, may be useful for implementing the sparse semantic segmentation system 100, as well as other neural network models. Using the sparse semantic segmentation system 100, a sparse 3D point cloud (e.g., obtained using a LIDAR unit) can be semantically segmented, to enable better understanding of the scene. This may be important in ADS or ADAS applications in autonomous or semi-autonomous vehicles, for example. Having access to the semantic segmentation of the scene, one can expand the number of the classes for object detection as desired.

The sparse intra-channel attention module may be used to process a feature representation (represented by a sparse tensor) so as to generate and apply attention weights over the local information in the feature representation, to enable the neural network model to focus on the feature(s) relevant to the perception task. The sparse inter-channel attention module may be used process a feature representation (represented by a sparse tensor) so as to obtain a more robust feature representation and emphasize the channel-wise feature representation. The sparse resolution tower module may be used to process a feature representation (represented by a sparse tensor) so as to process the feature representation more efficiently and generate richer features that a subsequent decoder block can benefit from.

In general, the use of a sparse tensor data structure to represent unstructured higher dimensional data enables the present disclosure to be applicable to various different types of higher dimensional data that represents sparse or scattered data points. By representing unstructured higher dimensional data as a sparse tensor, techniques for sparse convolution can be used. Although 3D point clouds are described as an example of unstructured higher dimensional data, this is not intended to be limiting.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

REFERENCES

The contents of the following published documents, which are referenced in this document, are incorporated herein by reference:

[1] Qi, Charles R., et al. "Pointnet: Deep learning on point sets for 3d classification and segmentation." Proceedings of the IEEE conference on computer vision and pattern recognition. 2017.
[2] Charles Ruizhongtai Qi, Li Yi, Hao Su, and Leonidas J Guibas. "Pointnet++: Deep hierarchical feature learning on point sets in a metric space." In Advances in neural information processing systems, pages 5099-5108, 2017.
[3] C. Choy, J. Gwak, and S. Savarese. 4d spatio-temporal-convnets: Minkowski convolutional neural networks. In Proceedings of the IEEE Conference on Computer Vision and Pattern361 Recognition, pages 3075-3084, 2019.
[4] Wu, Bichen, et al. "Squeezeseg: Convolutional neural nets with recurrent crf for real-time road-object segmentation from 3d lidar point cloud." 2018 IEEE International Conference on Robotics and Automation (ICRA). IEEE, 2018.
[5] Wu, Bichen, et al. "Squeezesegv2: Improved model structure and unsupervised domain adaptation for road-object segmentation from a lidar point cloud." 2019 International Conference on Robotics and Automation (ICRA). IEEE, 2019.
[6] Teichmann, Marvin T T, and Roberto Cipolla. "Convolutional CRFs for semantic segmentation." arXiv preprint arXiv:1805.04777 (2018).
[7] Wang, Yuan, et al. "Pointseg: Real-time semantic segmentation based on 3d lidarpoint cloud." arXivpreprint arXiv:1807.06288 (2018).
[8] Yu, Fisher, and VladlenKoltun. "Multi-scale context aggregation by dilated convolutions." arXivpreprint arXiv:1511.07122 (2015)

The invention claimed is:

1. A system comprising:
a processor device; and
a memory storing instructions that configure the processor device to compute a block of a trained neural network model, the block including a sparse inter-channel attention module, wherein computing the block comprises:
obtaining, as input to the block of the trained neural network model, an input sparse tensor in which each data point in the input sparse tensor has corresponding coordinate data and a feature vector, and wherein the corresponding coordinate data of each data point represent a coordinate location of the data point in a multi-dimensional coordinate space having three or more dimensions;
applying the sparse inter-channel attention module to the input sparse tensor by:
processing the input sparse tensor using a sparse global pooling squeeze layer to obtain a set of global attention weights;
processing the set of global attention weights using a sparse linear excitation layer to obtain a set of channel-wise attention weights; and
applying the set of channel-wise attention weights to the input sparse tensor to obtain a scaled feature representation having inter-channel attention applied; dampening the inter-channel attention including:
applying, to the scaled feature representation, a damping factor to obtain a regularized scaled feature representation; and
summing the regularized scaled feature representation with the input sparse tensor to obtain a summation output, the input sparse tensor having been scaled by a scaling factor complementary to the damping factor; and
outputting the summation output as an output sparse tensor of the block of the trained neural network model, each data point in the output sparse tensor corresponding to a respective data point in the input sparse tensor with corresponding coordinate data and a weighted feature vector.
2. The system of claim 1, wherein the block of the trained neural network model is an encoder block of an encoder stage of the trained neural network model.
3. The system of claim 1, wherein the block of the trained neural network model is a decoder block of a decoder stage of the trained neural network model.

4. A method for computing a block of a trained neural network model, the block including a sparse inter-channel attention module, wherein computing the block comprises:

obtaining, as input to the block of the trained neural network model, an input sparse tensor in which each data point in the input sparse tensor has corresponding coordinate data and a feature vector, and wherein the corresponding coordinate data of each data point represent a coordinate location of the data point in a multi-dimensional coordinate space having three or more dimensions;

applying the sparse inter-channel attention module to the input sparse tensor by:

processing the input sparse tensor using a sparse global pooling squeeze layer to obtain a set of global attention weights;

processing the set of global attention weights using a sparse linear excitation layer to obtain a set of channel-wise attention weights; and applying the set of channel-wise attention weights to the input sparse tensor to obtain a scaled feature representation having inter-channel attention applied; dampening the inter-channel attention including:

applying, to the scaled feature representation, a damping factor to obtain a regularized scaled feature representation; and summing the regularized scaled feature representation with the input sparse tensor to obtain a summation output, the input sparse tensor having been scaled by a scaling factor complementary to the damping factor; and outputting the summation output as an output sparse tensor of the block of the trained neural network model, each data point in the output sparse tensor corresponding to a respective data point in the input sparse tensor with corresponding coordinate data and a weighted feature vector.

5. The method of claim 4, wherein the block of the trained neural network model is an encoder block of an encoder stage of the trained neural network model.

6. The method of claim 4, wherein the block of the trained neural network model is a decoder block of a decoder stage of the trained neural network model.

\* \* \* \* \*